United States Patent
Bheda

(10) Patent No.: US 10,543,646 B2
(45) Date of Patent: Jan. 28, 2020

(54) STRUCTURAL SEWING AND OVERMOLDING

(71) Applicant: Arevo, Inc., Santa Clara, CA (US)

(72) Inventor: Hemant Bheda, Saratoga, CA (US)

(73) Assignee: Arevo, Inc., Milpitas, CA (US)

( * ) Notice: Subject to any disclaimer, the term of this patent is extended or adjusted under 35 U.S.C. 154(b) by 189 days.

(21) Appl. No.: 15/870,820

(22) Filed: Jan. 12, 2018

(65) Prior Publication Data

US 2019/0217556 A1 Jul. 18, 2019

(51) Int. Cl.
| | |
|---|---|
| *B29C 70/16* | (2006.01) |
| *B29C 64/147* | (2017.01) |
| *B29C 70/24* | (2006.01) |
| *B29C 45/14* | (2006.01) |
| *B29C 70/88* | (2006.01) |
| *B32B 27/08* | (2006.01) |
| *B32B 27/28* | (2006.01) |
| *D05B 1/14* | (2006.01) |
| *B33Y 10/00* | (2015.01) |

(52) U.S. Cl.
CPC ............ *B29C 70/16* (2013.01); *B29C 45/14* (2013.01); *B29C 64/147* (2017.08); *B29C 70/24* (2013.01); *B29C 70/887* (2013.01); *B32B 27/08* (2013.01); *B32B 27/288* (2013.01); *D05B 1/14* (2013.01); *B32B 2262/106* (2013.01); *B33Y 10/00* (2014.12); *D10B 2101/12* (2013.01); *D10B 2505/02* (2013.01)

(58) Field of Classification Search
CPC ...................................................... B29C 70/16
USPC ......................................................... 428/102
See application file for complete search history.

(56) References Cited

U.S. PATENT DOCUMENTS

| | | | |
|---|---|---|---|
| 4,206,895 A | 6/1980 | Olez | |
| 4,256,790 A | 3/1981 | Lackman et al. | |
| 4,528,051 A | 7/1985 | Heinze et al. | |
| 4,786,541 A | 11/1988 | Nishimura et al. | |
| 5,466,506 A | 11/1995 | Freitas et al. | |
| 5,586,997 A * | 12/1996 | Pall ................... | B01D 39/1623 210/505 |
| 5,589,015 A | 12/1996 | Freitas et al. | |
| 5,624,622 A | 4/1997 | Boyce et al. | |
| 5,827,383 A | 10/1998 | Campbell et al. | |
| 6,431,837 B1 | 8/2002 | Velicki | |
| 7,460,647 B2 | 12/2008 | Weiss et al. | |
| 7,930,907 B2 | 4/2011 | Dunn et al. | |
| 7,942,993 B2 | 5/2011 | Gessler et al. | |

(Continued)

FOREIGN PATENT DOCUMENTS

| | | |
|---|---|---|
| CN | 20131325634 A | 11/2013 |
| DE | 20101033287 A1 | 2/2012 |

(Continued)

OTHER PUBLICATIONS

Composite Envisions LLC, "Carbon Fiber Fabric Quadaxial 90/+45/−45/0 Degree" Web Page, 2017.

(Continued)

*Primary Examiner* — Brent T O'Hern
(74) *Attorney, Agent, or Firm* — McGeary Cukor LLC; Jason Paul DeMont; Kenneth Ottesen

(57) ABSTRACT

The illustrative embodiment comprises the sewing of fibers into a sewing substrate, which is then overmolded, to enable the manufacture of strong and lightweight articles with complex geometries.

13 Claims, 23 Drawing Sheets

Tensile Stitch Pattern
(orthographic side view at cross-section AA-AA)

(56) References Cited

U.S. PATENT DOCUMENTS

| | | |
|---|---|---|
| 8,672,636 B2 | 3/2014 | Laurent |
| 8,858,857 B2 | 10/2014 | Wood et al. |
| 9,050,756 B2 | 6/2015 | Trentcosta et al. |
| 9,492,970 B2 | 11/2016 | Karvinen |
| 2007/0193246 A1 | 8/2007 | Schneider |
| 2010/0021682 A1 | 1/2010 | Liang et al. |
| 2010/0209658 A1 | 8/2010 | Roth |
| 2013/0118142 A1 | 5/2013 | Gommel et al. |
| 2016/0262208 A1 | 9/2016 | Hsieh et al. |
| 2017/0028601 A1 | 2/2017 | Soni et al. |
| 2017/0120519 A1 | 5/2017 | Mark |

FOREIGN PATENT DOCUMENTS

| | | |
|---|---|---|
| EP | 1 023 986 A1 | 8/2000 |
| EP | 3095590 A1 | 11/2016 |
| WO | 96 20073 A | 7/1996 |
| WO | 97 16303 A | 5/1997 |
| WO | 2017046555 A2 | 3/2017 |

OTHER PUBLICATIONS

Paul Mattheij, Konrad Gliesche, Dirk Feltin, Tailore Fiber Placement—Mechanical Properties and Applications, SAGE Journals, Jun. 1, 1998.

Ginger Gardiner, "Tailored Fiber Placement: Best Metal in Volume Production," Sep. 2, 2013.

PCT "International Search Report," International Application No. PCT/US2019/012461, dated Apr. 24, 2019.

PCT "Written Opinion of the International Search Authority," International Application No. PCT/US2019/012461, dated Apr. 24, 2019.

PCT "Written Opinion of the International Preliminary Examining Authority," International Application No. PCT/ US2019/012461, dated Nov. 21, 2019.

European Search Report for EP 1 023 986 A1, dated Jun. 16, 1999.

* cited by examiner

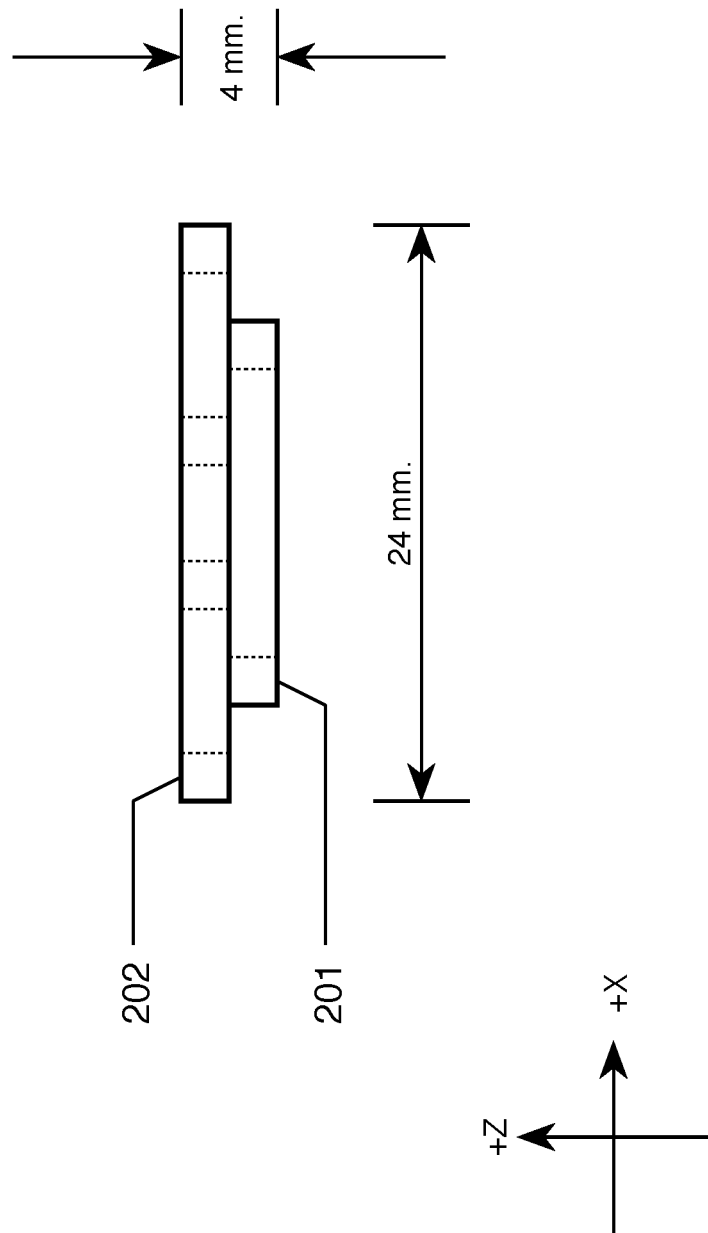

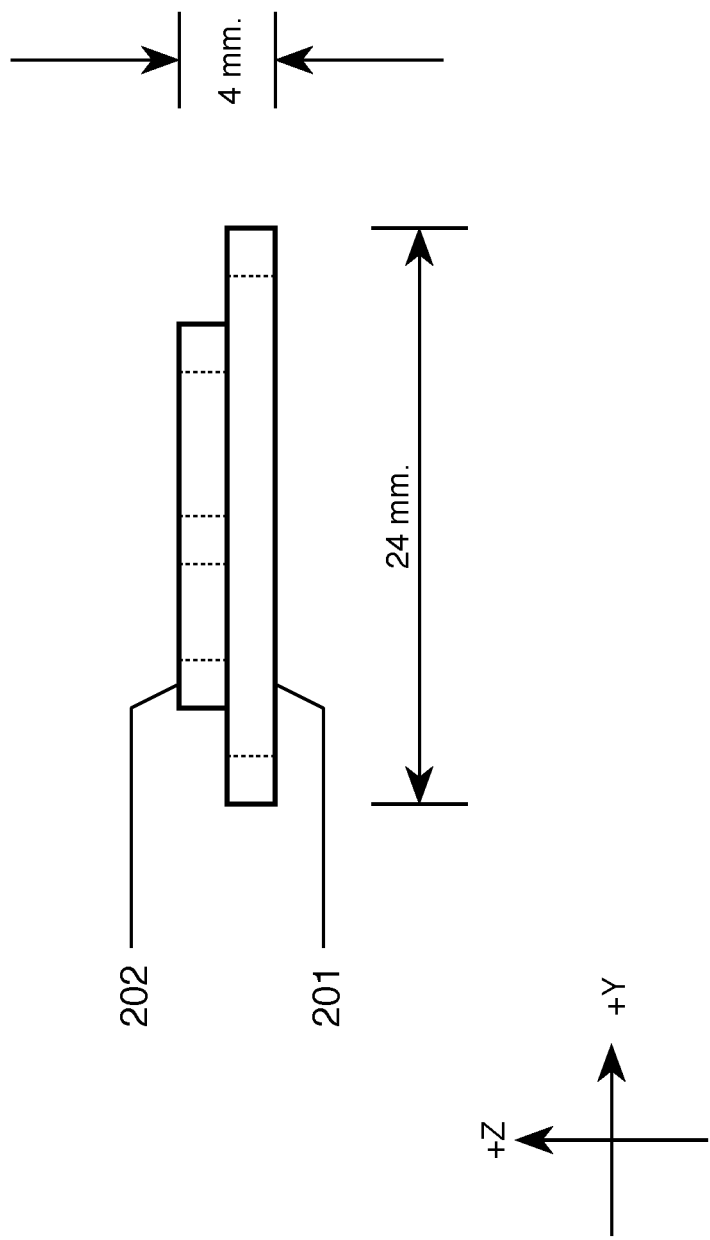

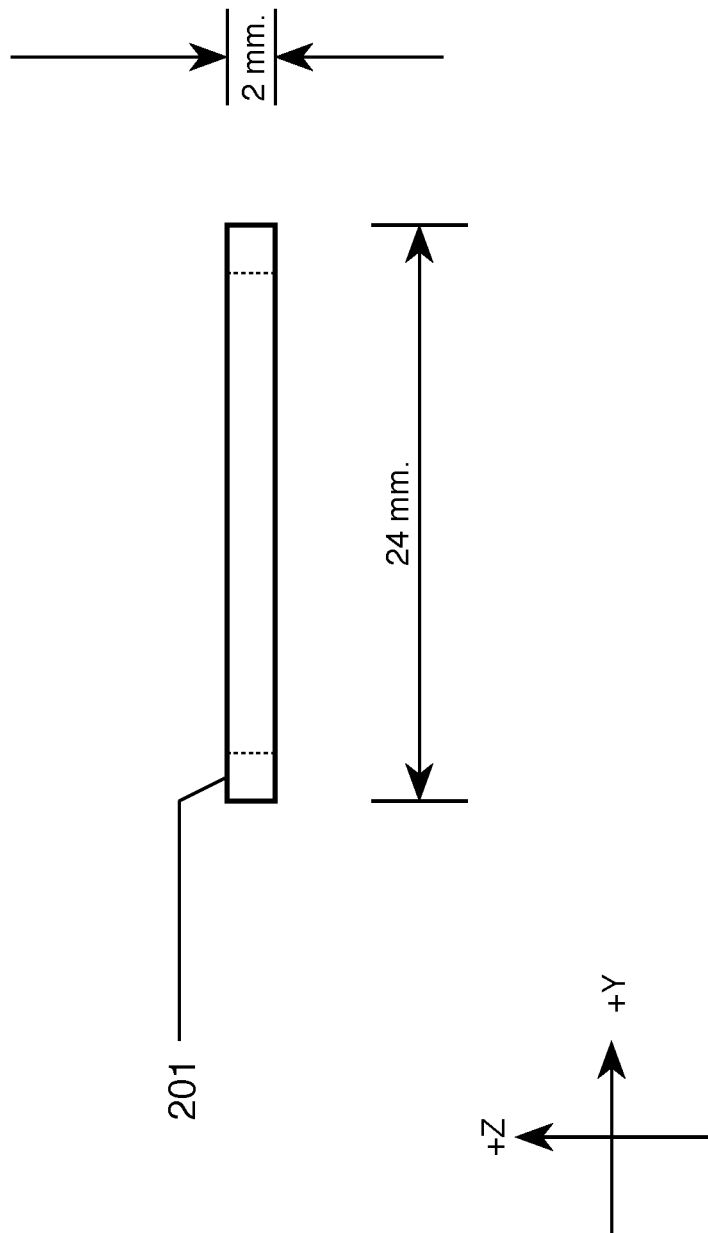

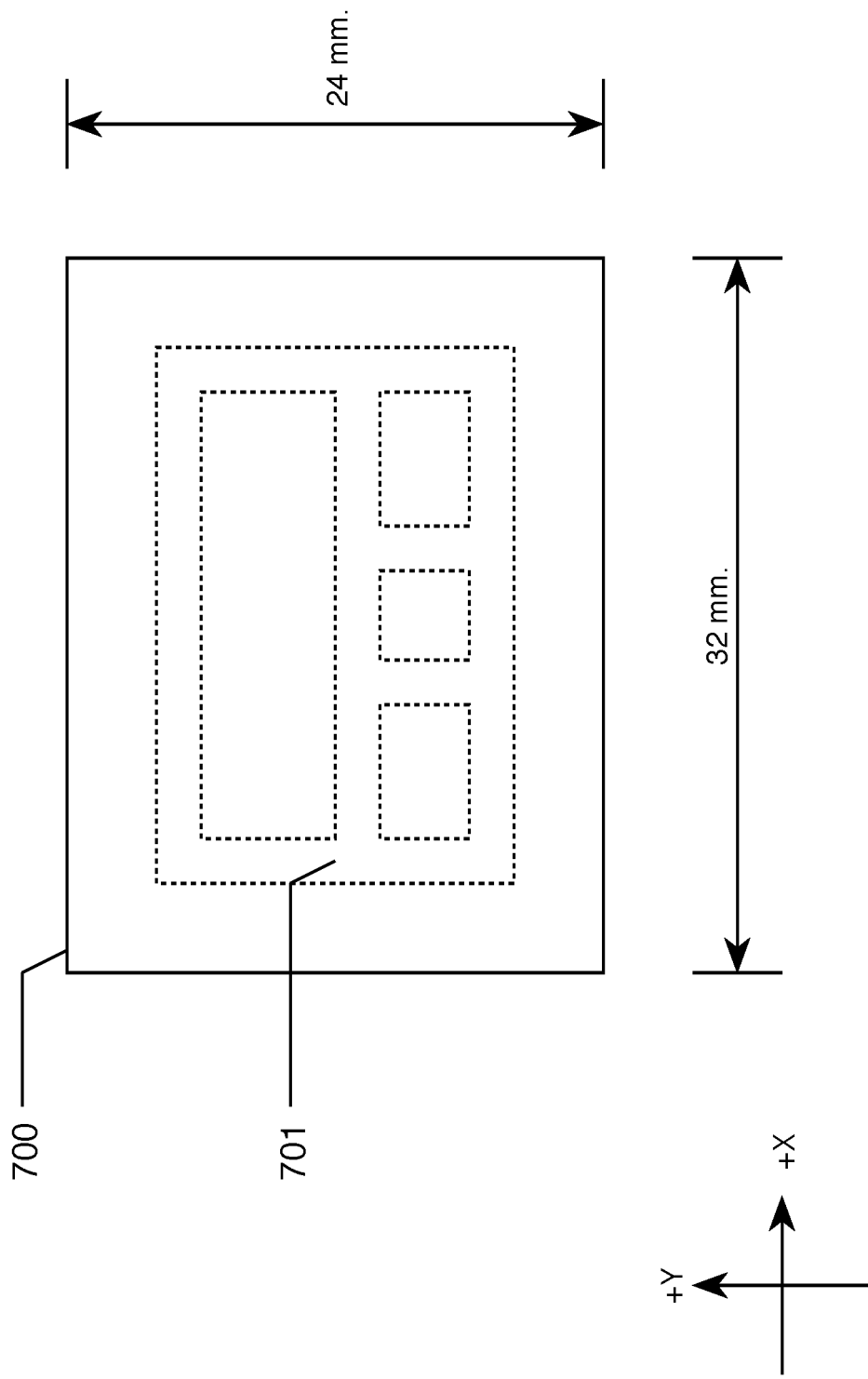

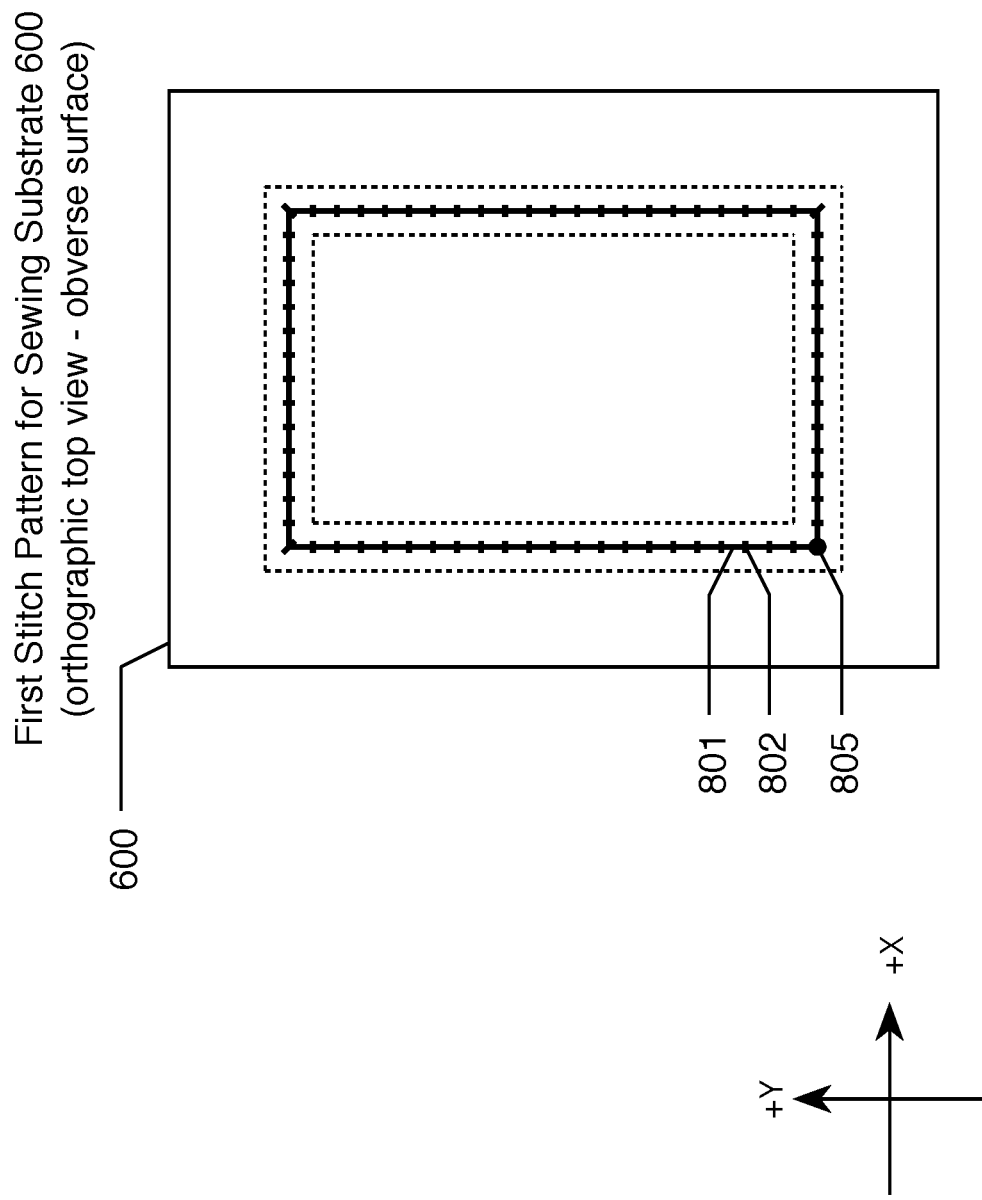

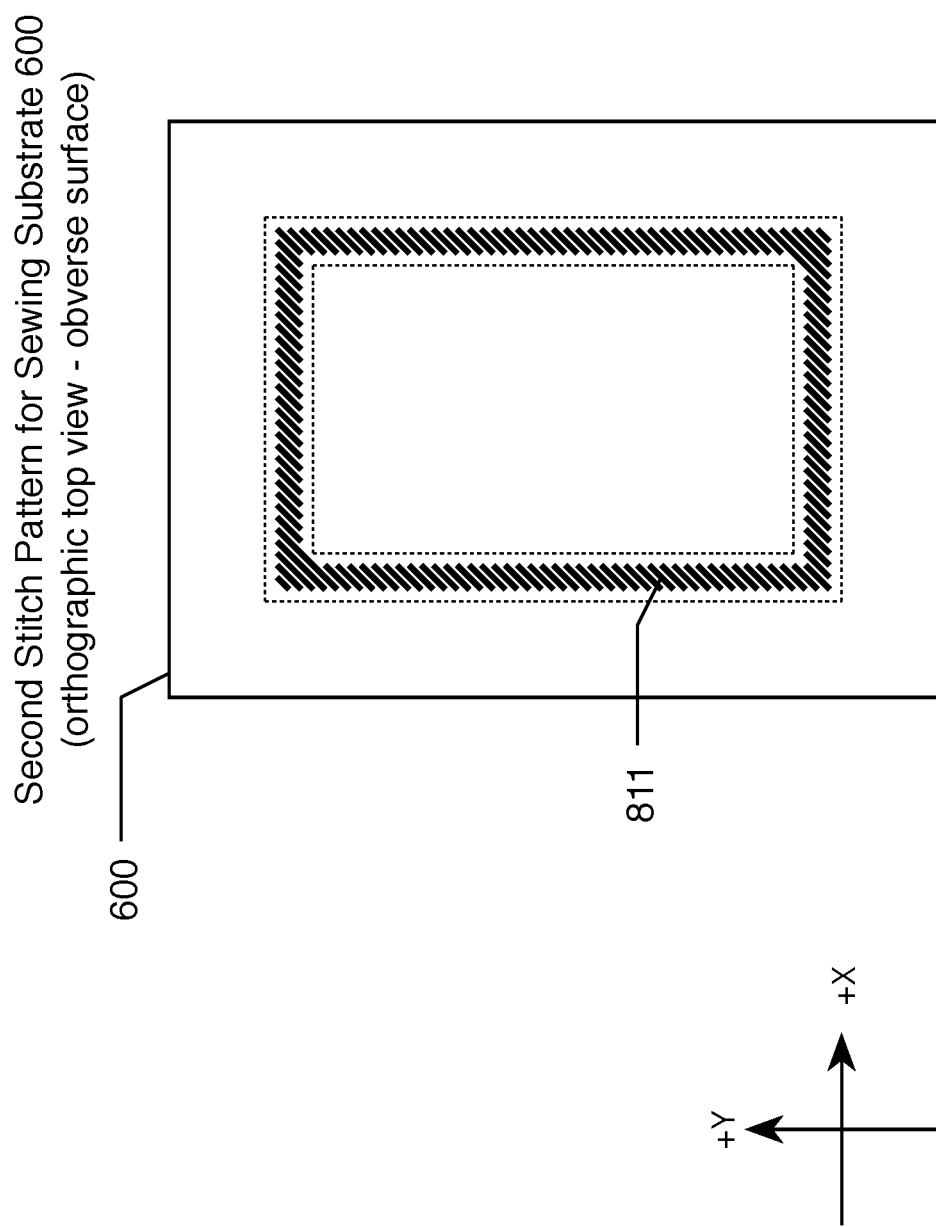

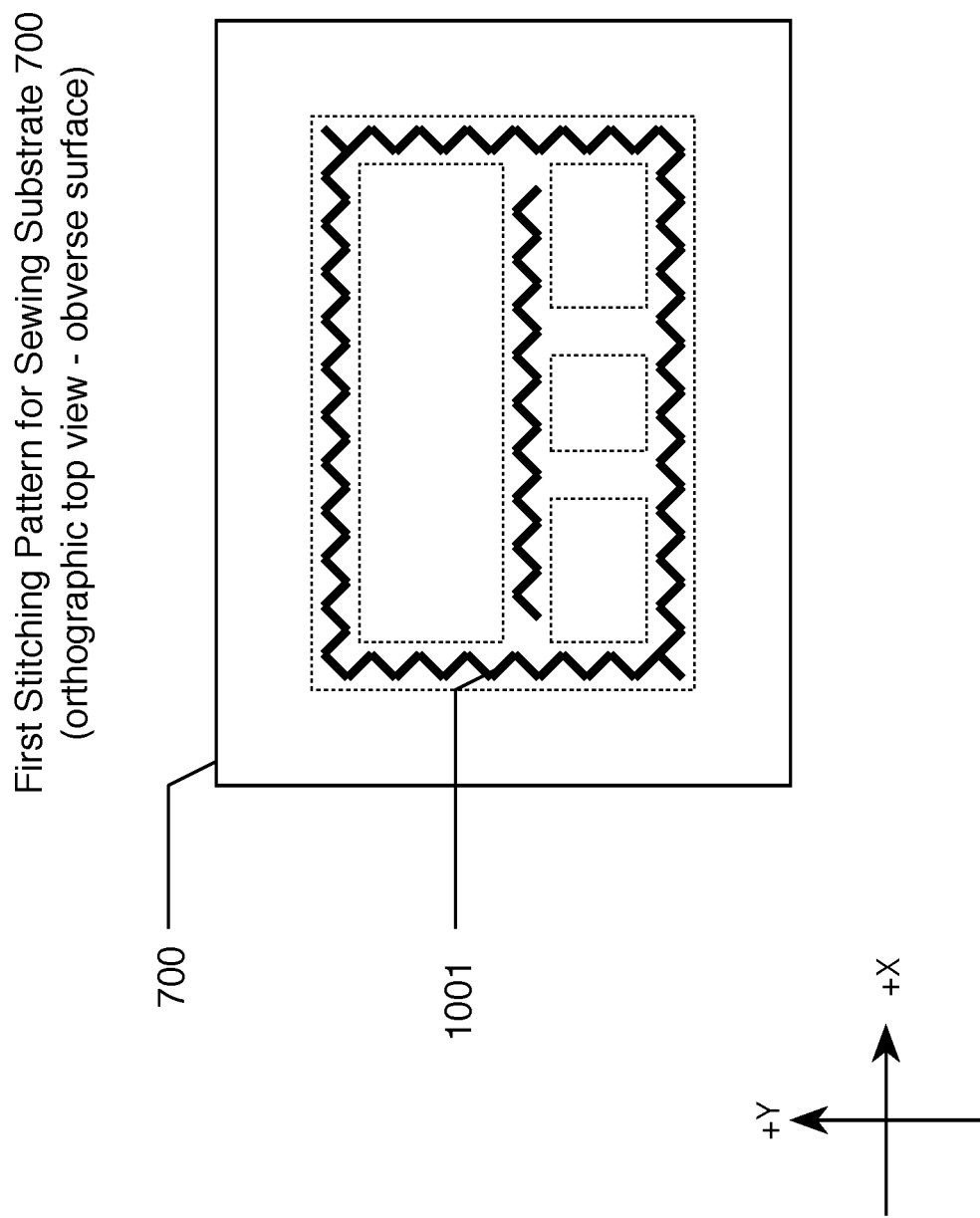

STRUCTURAL SEWING AND OVERMOLDING

FIELD OF THE INVENTION

The present invention relates to additive manufacturing of three-dimensional object in general, and, more particularly, to a technique for manufacturing objects by sewing.

BACKGROUND

In general, there are two complementary approaches to manufacture an object: additive manufacturing and subtractive manufacturing.

Additive manufacturing involves aggregating material to form the desired object. In contrast, subtractive manufacturing involves removing material to form the desired object. In practice, many objects are manufactured using a combination of additive and subtractive techniques.

A form of additive manufacturing—colloquially known as "3D printing"—is the subject of intense research and development because it enables objects with complex geometries to be manufactured without molds or dies. Furthermore, 3D printing enables the mass customization of objects with different dimensions and characteristics. There remain, however, many challenges in the design, manufacture, and use of 3D printers.

SUMMARY OF THE INVENTION

The present invention enables some articles of manufacture to be fabricated that cannot be manufactured in the prior art and some other articles of manufacture to be fabricated more easily and/or more economically than can be done in the prior art.

In accordance with the illustrative embodiment, an article of manufacture is fabricated by sewing one or more "sewing substrates" with threads and by overmolding the sewn substrates with thermoplastic or thermoset or thermoplastic and thermoset. The sewing substrate comprises a specific material and a specific geometry that might or might not significantly contribute to the physical properties of the article of manufacture. The threads comprise specific materials and specific stitches in specific locations and do significantly contribute to the physical properties of the article of manufacture.

For example, threads made from materials such as continuous carbon fiber, metal, natural fibers, and synthetic fibers, when sewn in specific stitches and in advantageous locations, can significantly contribute the physical properties of the article of manufacture. For example, the sewing with specific threads and stitches can allow the structural, thermal, electrical, electromagnetic, and chemical properties of an article of manufacture to be tailored more easily and economically than in the prior art.

BRIEF DESCRIPTION OF THE DRAWINGS

FIG. 2a depicts an orthographic front view of article of manufacture 200.

FIG. 2c depicts an orthographic side view of article of manufacture 200.

FIG. 4c depicts an orthographic side view of sub-article of manufacture 201.

FIG. 7 depicts a drawing of sewing substrate 700, which is the sewing substrate for sub-article 202.

FIG. 8a depicts a drawing of sewing substrate 600 and first stitch pattern.

FIG. 8b depicts a drawing of sewing substrate 600 and second stitch pattern.

FIG. 10a depicts a drawing of sewing substrate 700 and first stitch pattern.

DEFINITIONS

For the purposes of this specification a "tensile stitch" is defined as a multi-thread straight stitch in which one thread is rectilinear.

For the purposes of this specification, the term "sewable solid" is defined as a material that is capable of being sewn or laced and is not a textile.

For the purposes of this specification, a "textile" is defined as a material that is manufactured from a network of:
  (i) natural fibers, or
  (ii) synthetic fibers, or
  (iii) semi-synthetic fibers, or
  (iv) any combination of i, ii, and iii.

DETAILED DESCRIPTION

Figure 1:
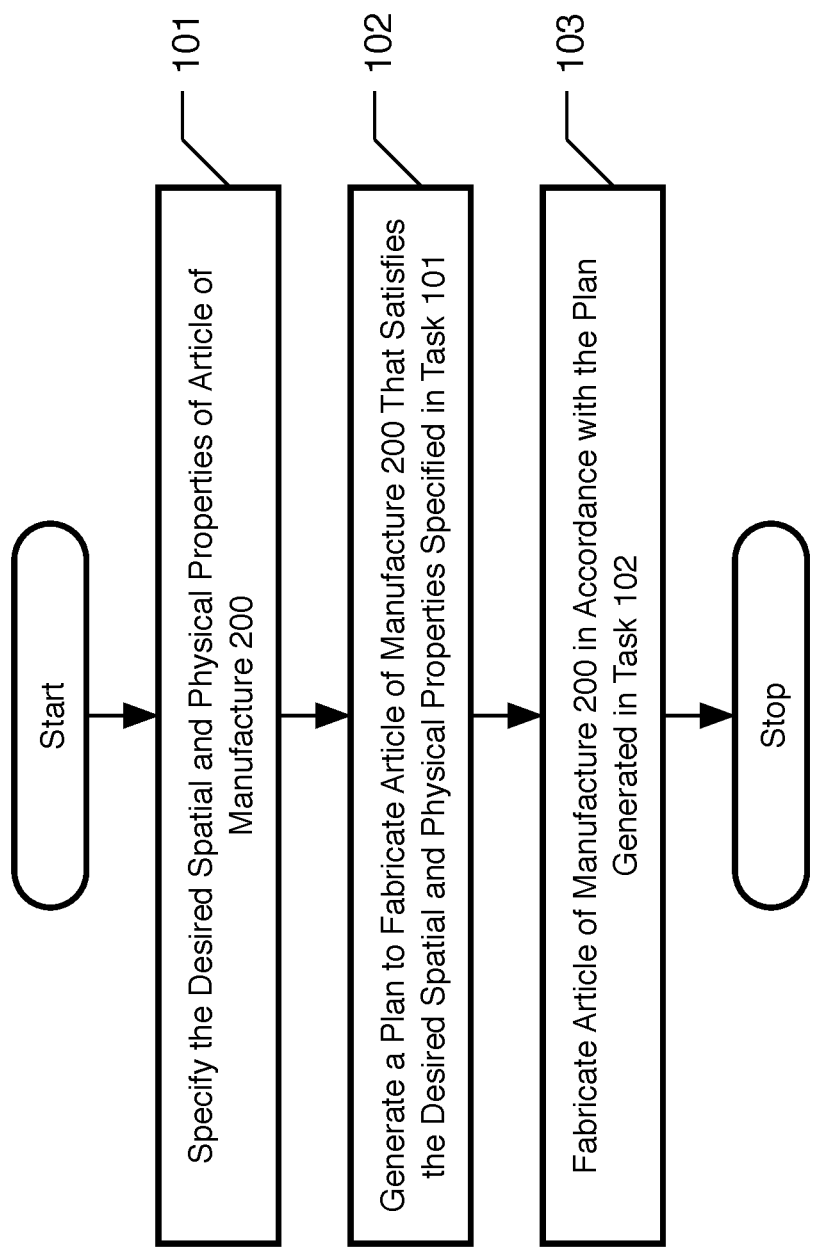
FIG. 1 depicts a flowchart of the salient tasks associated with fabricating an article of manufacture 200.
Figure 2B:
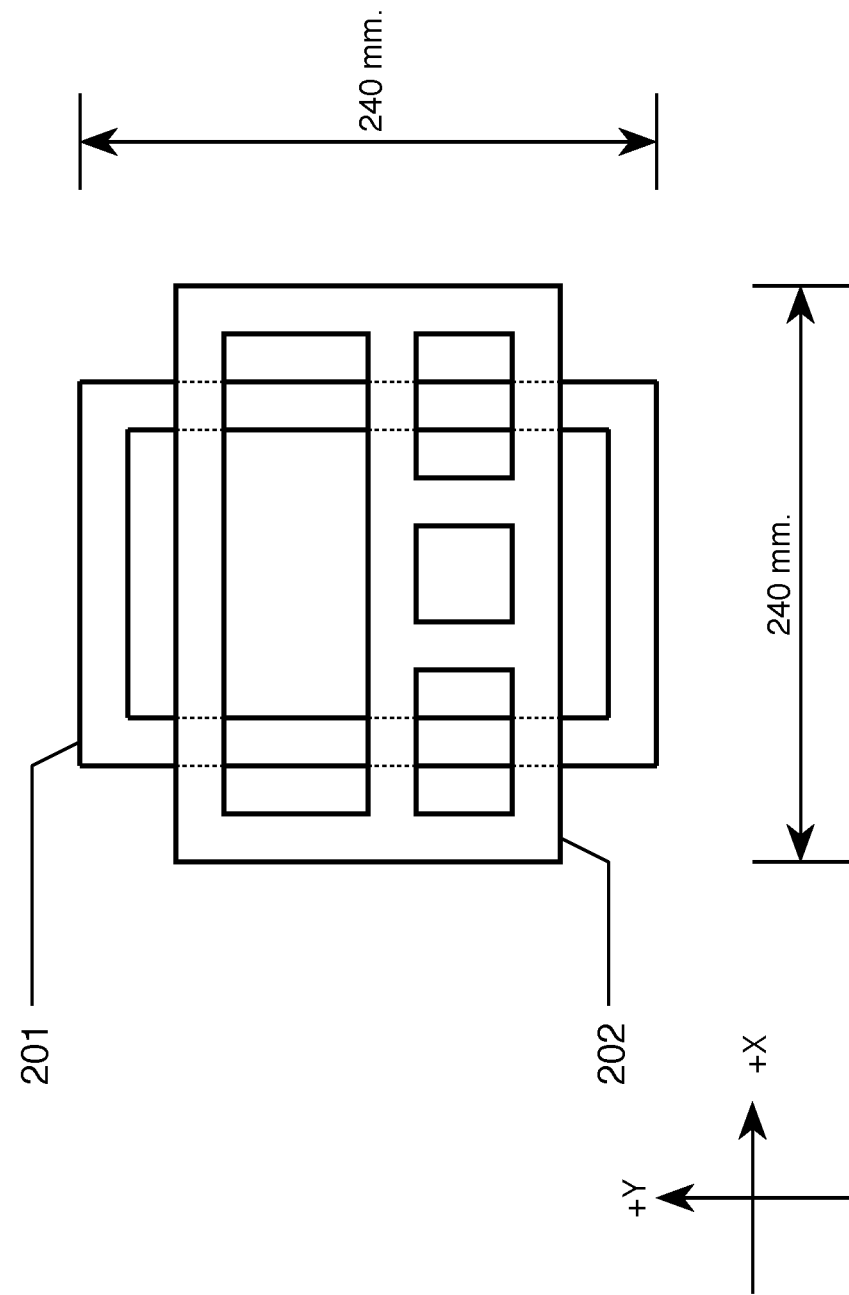
FIG. 2b depicts an orthographic top view of article of manufacture 200.
Figure 2D:
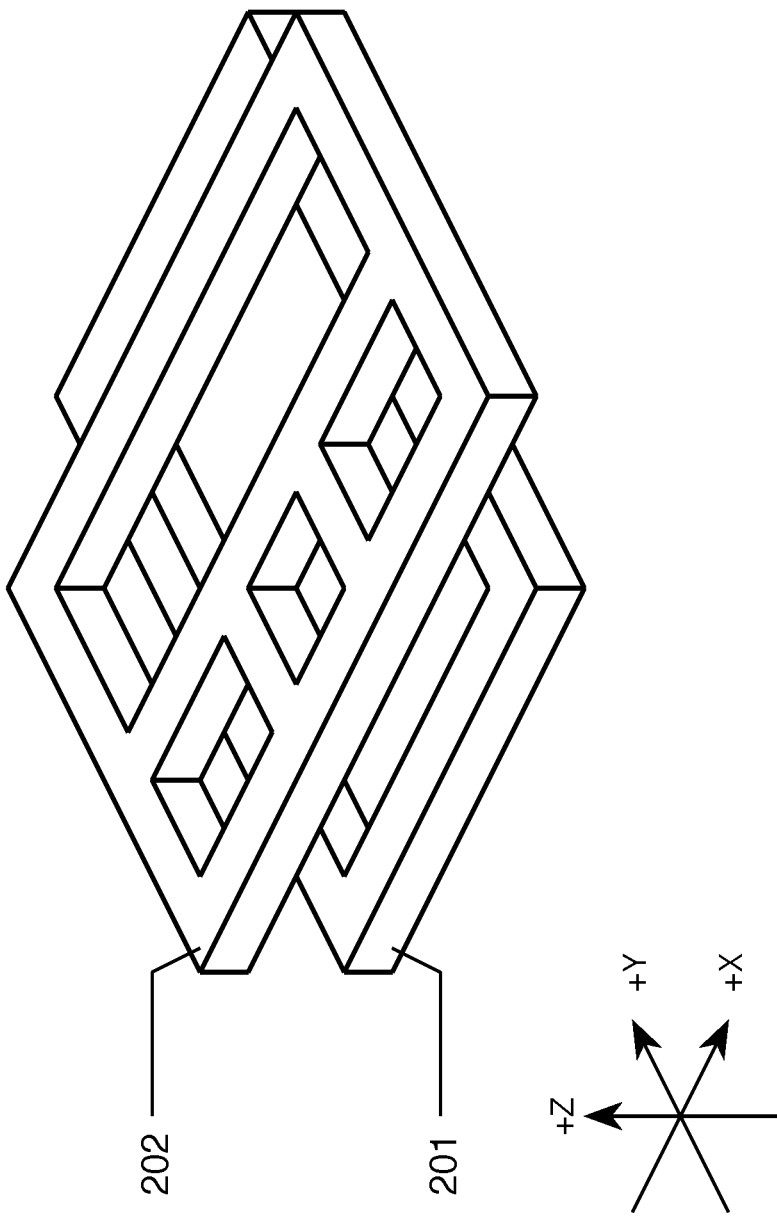
FIG. 2d depicts an isometric view of the salient aspects of article of manufacture 200.

FIG. 1 depicts a flowchart of the salient tasks associated with performance of the illustrative embodiment, which designs and fabricates a finished article of manufacture.

At task 101, a human designer uses a computer-aided-design system (e.g., Dassault Systémes SolidWorks®, etc.) to design article of manufacture 200.

As part of task 101, the designer uses the computer-aided-design system to specify the spatial properties (e.g., the shape, the size, tolerances, surface textures, etc.) of article 200. Article 200 is depicted in FIGS. 2*a*, 2*b*, 2*c*, and 2*d*, and it is 24 mm. wide, 24 mm. deep, and 4 mm. high. It will be clear to those skilled in the art, after reading this disclosure, how to make and use alternative embodiments of the present invention that have any spatial properties.

For pedagogical reasons, article 200 comprises only straight features, but it will be clear to those skilled in the art, after reading this disclosure, how to make and use alternative embodiments of the present invention that comprise:
(i) one or more straight features, or
(ii) one or more curved features, or
(iii) any combination of i and ii.

For pedagogical reasons, article 200 comprises only n/2 (i.e., right) angles, but it will be clear to those skilled in the art, after reading this disclosure, how to make and use alternative embodiments of the present invention that comprise:
(i) one or more acute angles or $$\left(\text{i.e., } 0 < \theta < \frac{\pi}{2}\right),$$

(ii) one or more right angles or $$\left(\text{i.e., } \theta = \frac{\pi}{2}\right),$$

(iii) one or more obtuse angles or $$\left(\text{i.e., } \frac{\pi}{2} < \theta < \pi\right),$$

(iv) any combination of i, ii, and iii.

In accordance with the illustrative embodiment, article 200 comprises ten apertures (i.e., article 200 has an Euler characteristic of −18), but it will be clear to those skilled in the art, after reading this disclosure, how to make and use alternative embodiments of the present invention that do not comprise any apertures. Furthermore, it will be clear to those skilled in the art, after reading this disclosure, how to make and use alternative embodiments of the present invention that comprise any number of apertures (e.g., zero apertures, one aperture, two apertures, three apertures, four apertures, 32 apertures, 64 apertures, 128 apertures, 1000 apertures, 100,000 apertures, etc.).

It will be clear to those skilled in the art how to use a computer-aided-design system to specify the spatial properties of article 200, and it will be clear to those skilled in the art how to use a computer-aided-design system to specify the spatial properties of any alternative embodiment of the present invention.

As part of task 101, the designer specifies:
(i) the desired structural attributes of article 200 (e.g., the ultimate tensile strength on one or more axes through article 200, the compressive strength on one or more axes through article 200, the torsional rigidity around one or more axes through article 200, the bending stiffness in any plane of article 200, etc.), or
(ii) the desired thermal attributes of article 200 (e.g., the isotropic and non-isotropic heat transfer properties of each part of article 200, etc.), or
(iii) the desired electrical and electromagnetic attributes of article 200 (e.g., the isotropic and non-isotropic direct-current resistance of each part of article 200, the isotropic and non-isotropic reactance of each part of article 200, the magnetic properties of each part of article 200, etc.), or
(iv) the desired chemical attributes of article 200 (e.g., the desired ultraviolet resistance of each part of article 200, etc.), or
(v) any combination of i, ii, iii, and iv.

It will be clear to those skilled in the art how to specify the desired structural, thermal, electrical, electromagnetic, chemical, and other physical properties of article 200, and it will be clear to those skilled in the art how to use a computer-aided-design system to specify the desired structural, thermal, electrical, electromagnetic, chemical, and other physical properties of any alternative embodiment of the present invention.

At task 102, the designer uses the computer-aided-design system to generate a plan to fabricate article 200, which satisfies all of the properties specified in task 101. The details of task 102 are described in FIGS. 3 and 11 and in the accompanying text and figures.

At task 103, article of manufacture 200 is fabricated in accordance with the plan generated in task 102.

Figure 3:
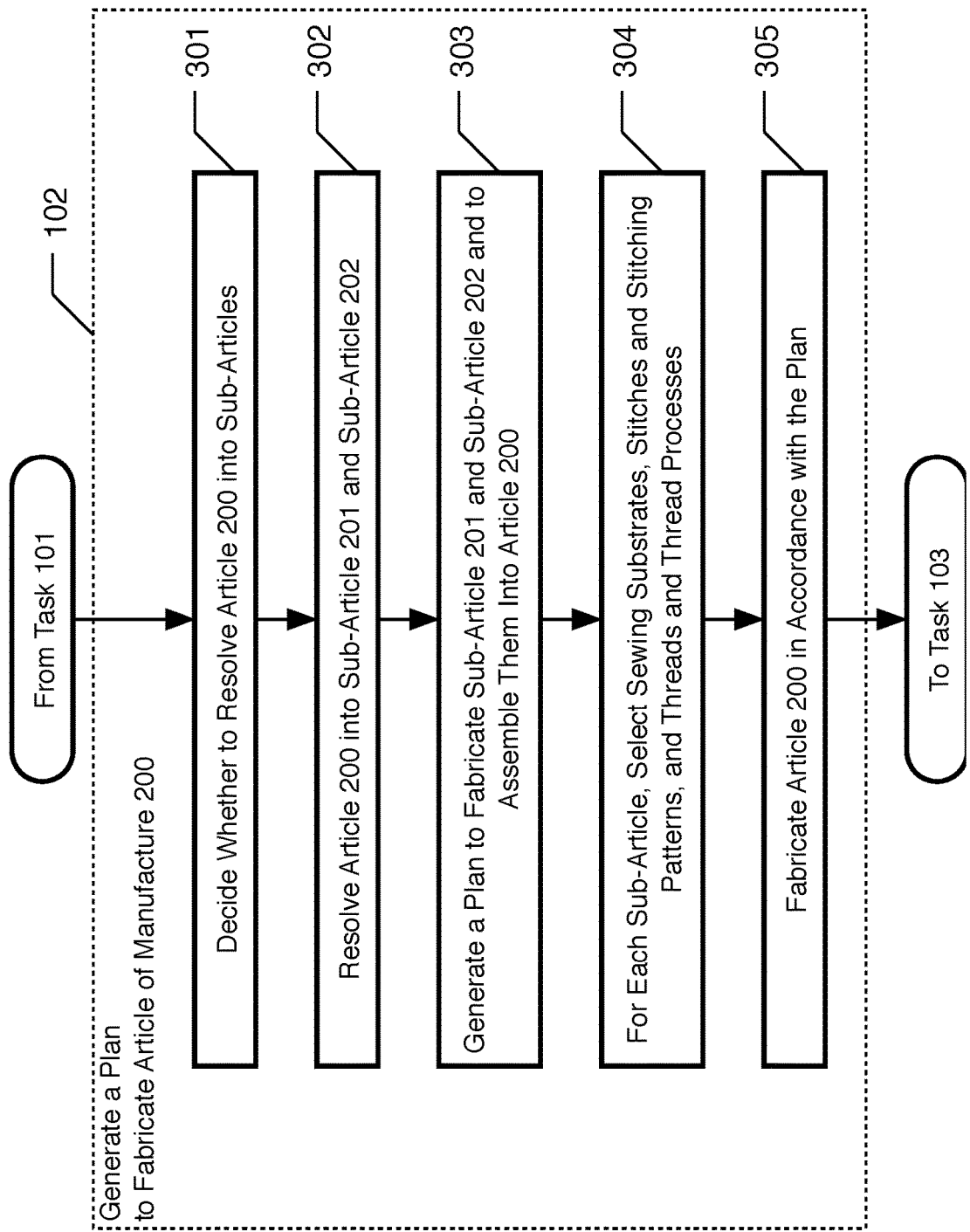
FIG. 3 depicts a flowchart of the salient sub-tasks associated with task 102.
Figure 4A:
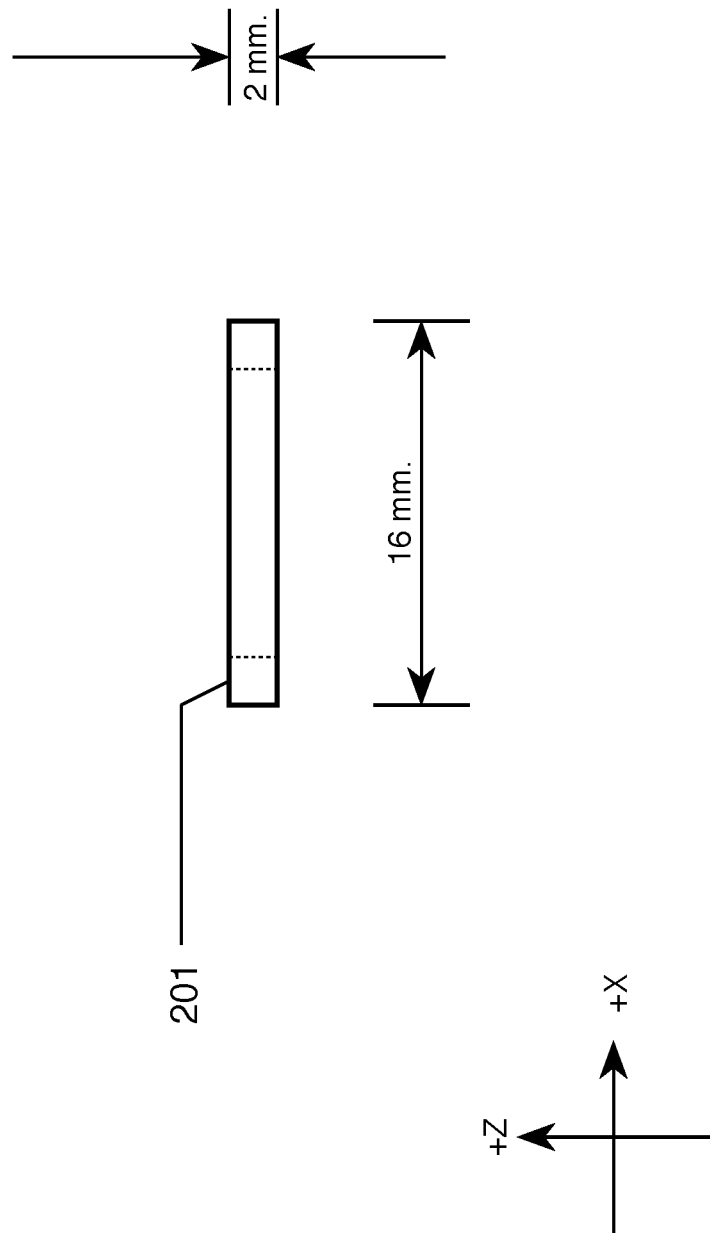
FIG. 4a depicts an orthographic front view of sub-article of manufacture 201.
Figure 4B:
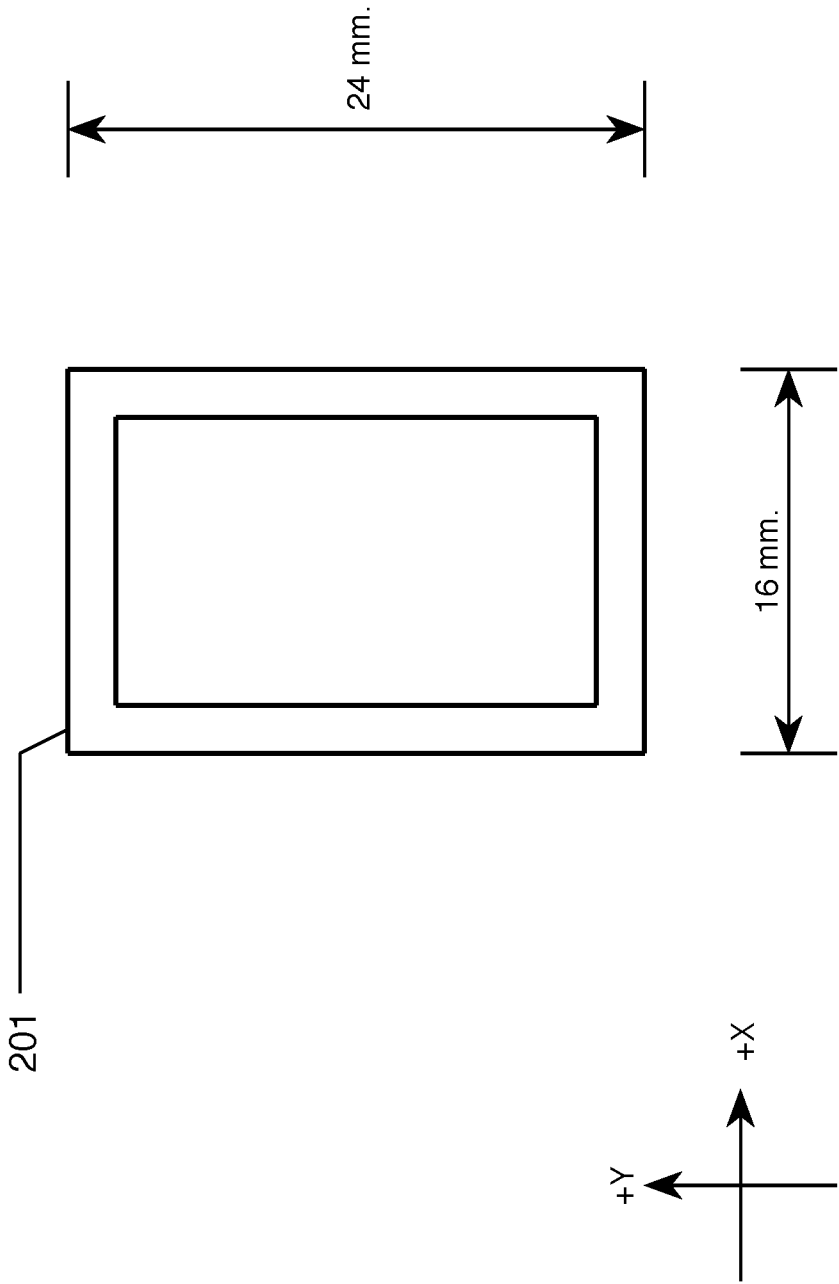
FIG. 4b depicts an orthographic top view of sub-article of manufacture 201.
Figure 4D:
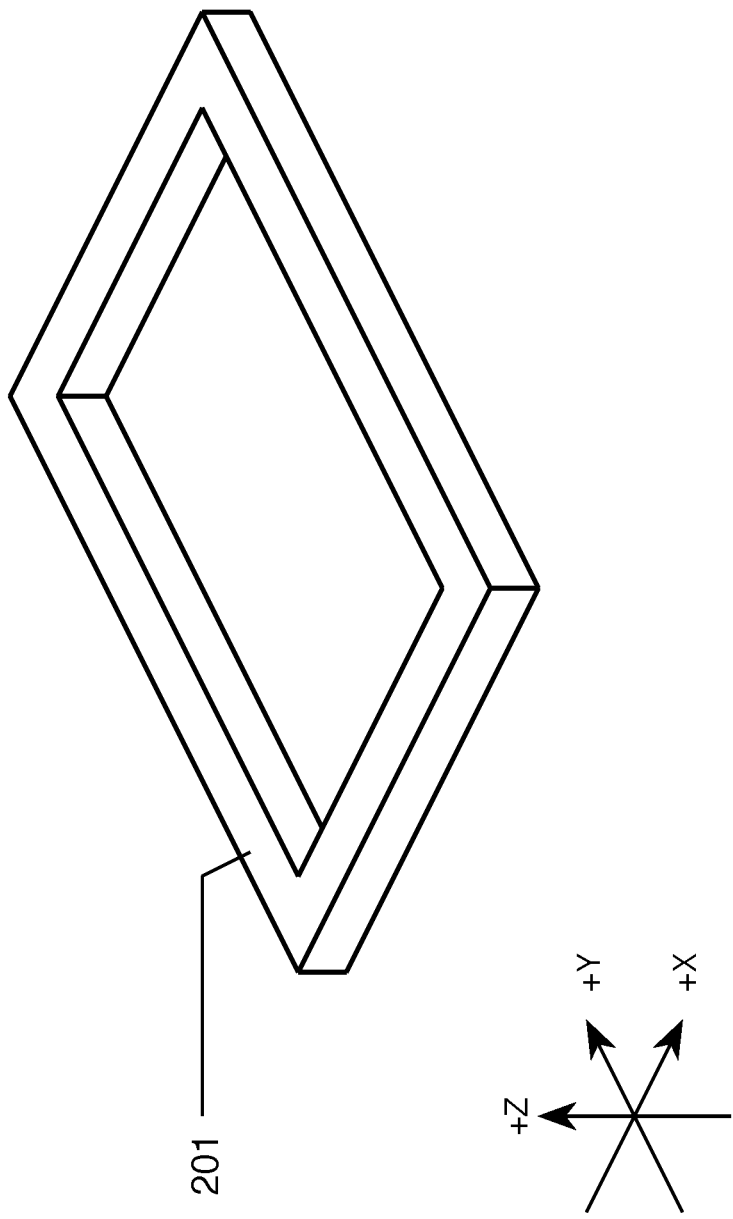
FIG. 4d depicts an isometric view of the salient aspects of sub-article of manufacture 201.
Figure 5A:
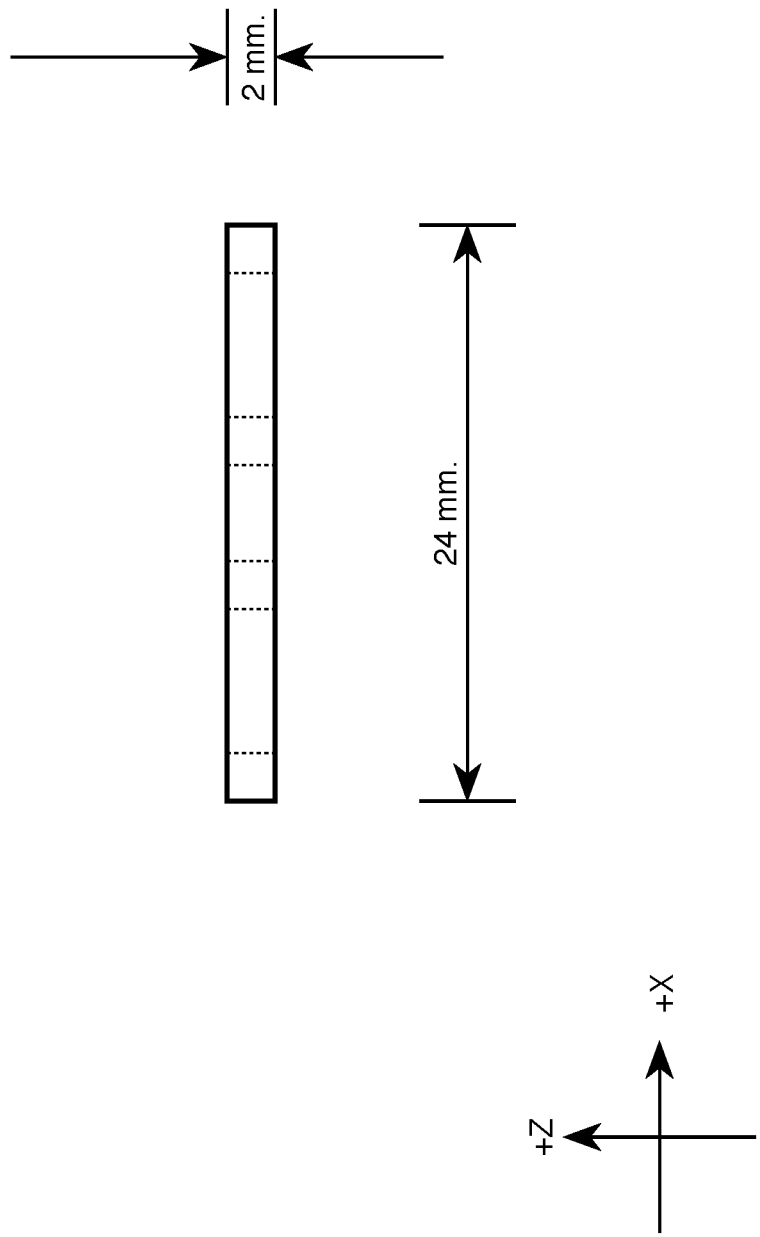
FIG. 5a depicts an orthographic front view of sub-article of manufacture 202.
Figure 5B:
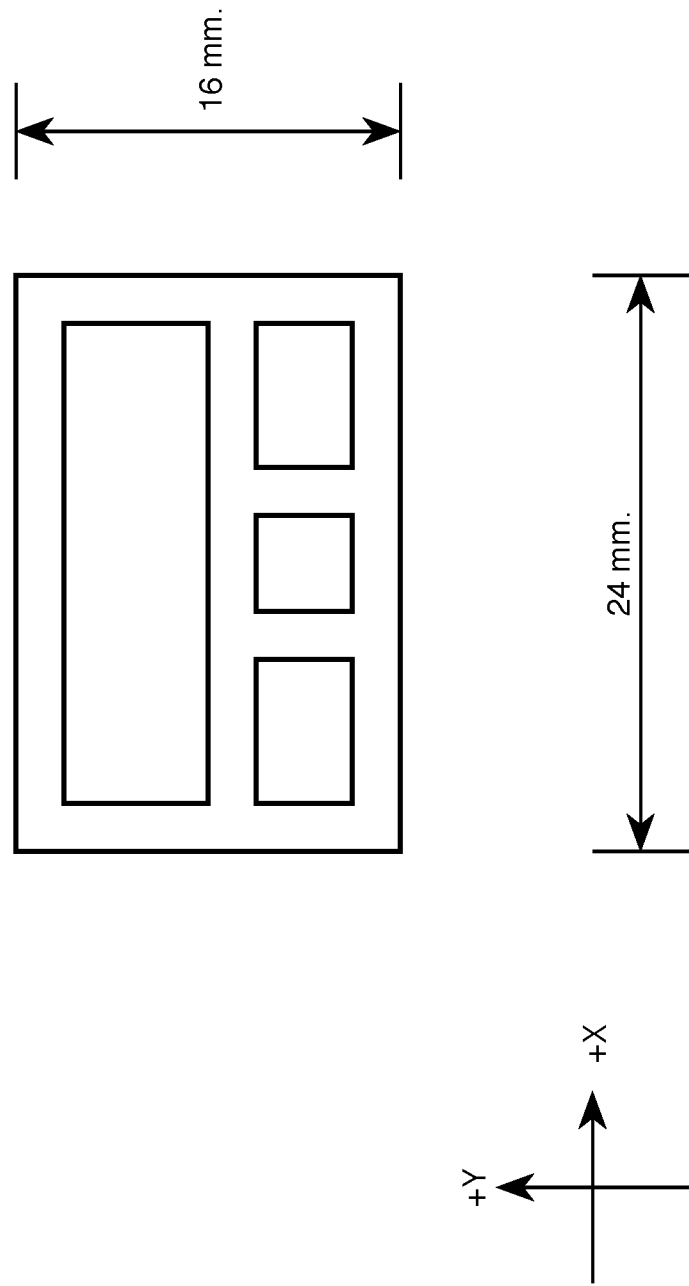
FIG. 5b depicts an orthographic top view of sub-article of manufacture 202.
Figure 5C:
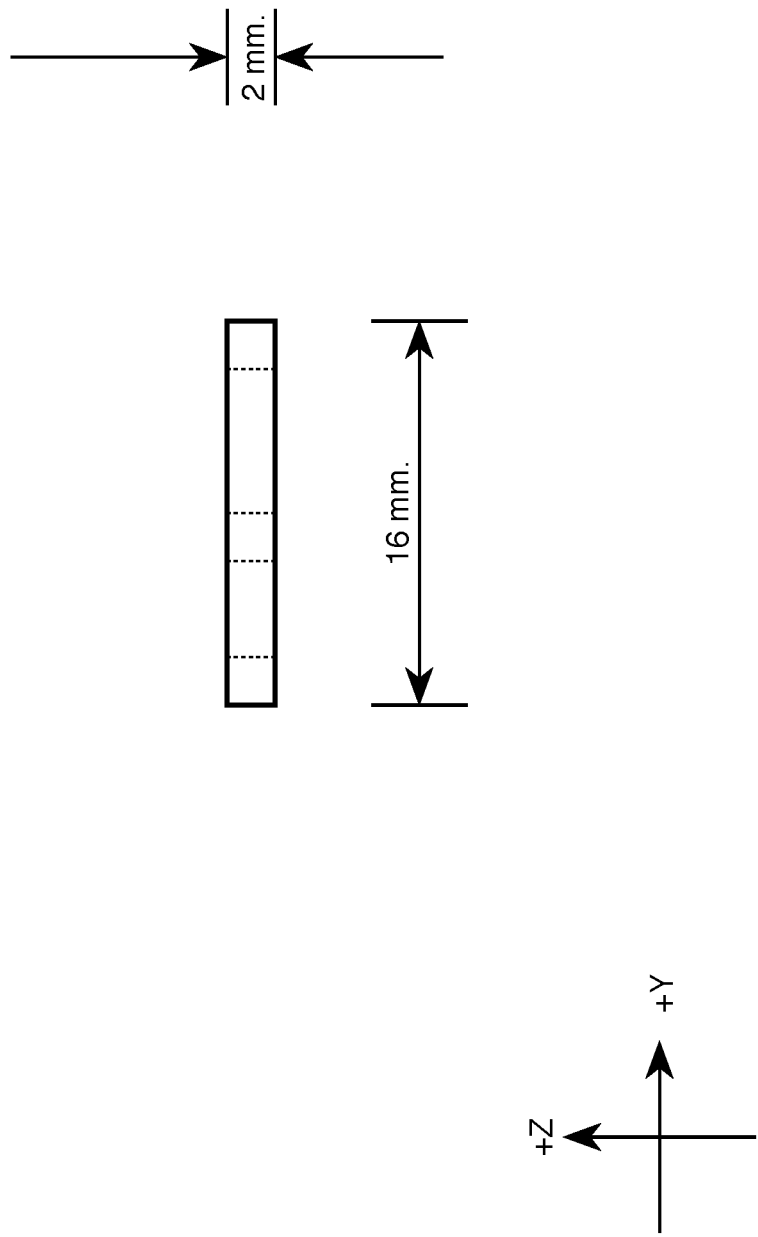
FIG. 5c depicts an orthographic side view of sub-article of manufacture 202.
Figure 5D:
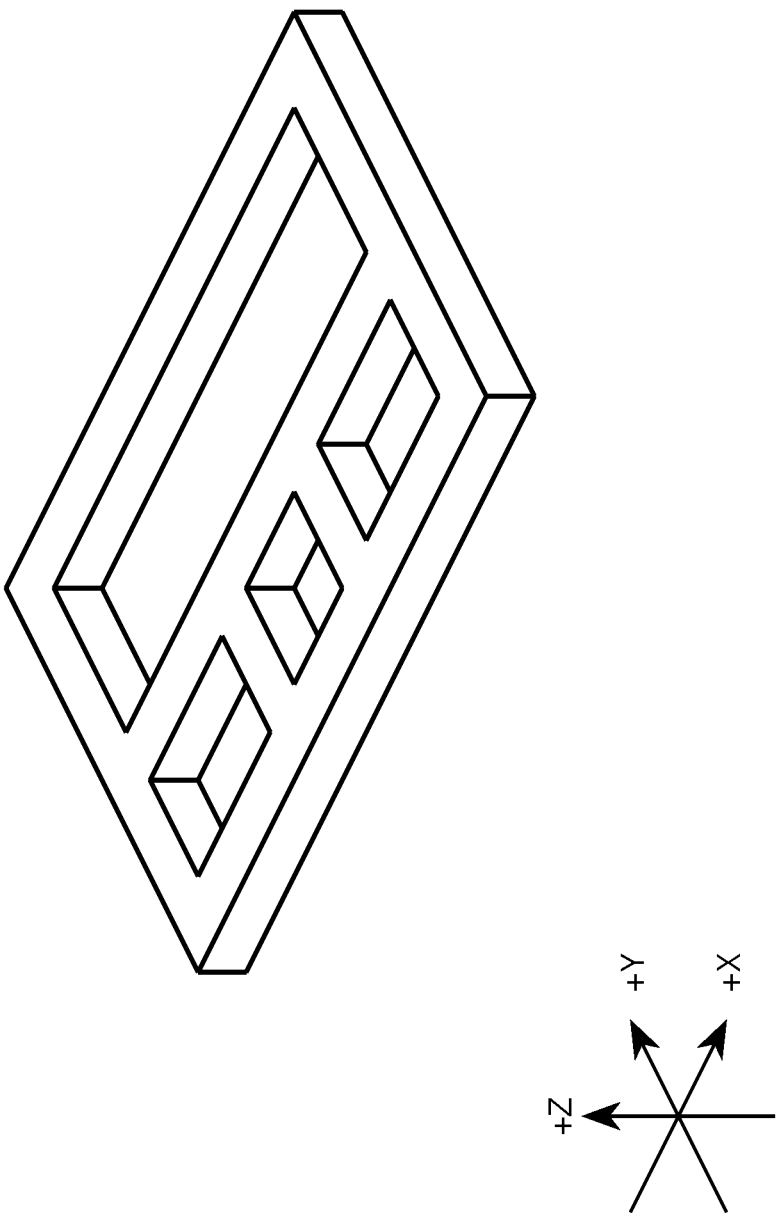
FIG. 5d depicts an isometric view of the salient aspects of sub-article of manufacture 202.

FIG. 3 depicts a flowchart of the salient sub-tasks associated with the performance of task 102—generating a plan to fabricate article of manufacture 200—in accordance with the illustrative embodiment of the present invention.

Some articles of manufacture are easily and economically fabricated as an integrated whole. In contrast, some articles of manufacture are more easily and/or more economically fabricated by aggregating two or more sub-articles of manufacture, each of which is individually fabricated and then assembled into the article of manufacture. Therefore, at task 301, the designer uses the computer-aided-design system to decide whether to fabricate article 200 as a whole or as an assembly of sub-articles. In accordance with the illustrative embodiment, the decision is made to fabricate article 200 as two sub-articles—sub-article 201 and sub-article 202.

When the decision is made to fabricate an article of manufacture as a whole, then one sewing substrate is sewn and overmolded (as discussed below). In contrast, when the decision is made to fabricate an article of manufacture as an assembly of sub-articles, then each sub-article is fabricated from a sewing substrate that is sewn and overmolded (as discussed below). It will be clear to those skilled in the art, after reading this disclosure, how to perform task 301.

At task 302, article 200 is resolved into two sub-articles—sub-article 201 and sub-article 202—along a plane that is perpendicular to the Z-axis. Sub-article 201 is depicted in FIGS. 4*a*, 4*b*, 4*c*, and 4*d*, and sub-article 202 is depicted in FIGS. 5*a*, 5*b*, 5*c*, and 5*d*.

In accordance with the illustrative embodiment, article 200 is resolved into sub-article 201 and sub-article 202 because the desired spatial and physical properties of article 200 can be most easily and most economically achieved by resolving article 200 into two substantially "flat" sub-articles. It will be clear to those skilled in the art, after reading this disclosure, how to use any criteria for deciding how to resolve an article into a plurality of sub-articles.

It will be clear to those skilled in the art, after reading this disclosure, how to fabricate article 200—or any article of manufacture—without resolution in sub-articles (i.e., by fabricating the article of manufacture directly as a whole). Alternatively, it will be clear to those skilled in the art, after reading this disclosure, how to resolve article 200—or any alternative embodiment of the present invention—into any number of sub-articles (e.g., three sub-articles, four sub-articles, five sub-articles, eight sub-articles, 20 sub-articles, 50 sub-articles, 128 sub-articles, 512 sub-articles, 2000 sub-articles, etc.) and how to assemble the sub-articles into the final article of manufacture.

In accordance with the illustrative embodiment, article 200 is resolved into two sub-articles along one specific plane but it will be clear to those skilled in the art, after reading this disclosure, that any article of manufacture can be resolved into sub-articles of different shapes in a multitude of ways.

It will be clear to those skilled in the art, however, after reading this disclosure, how to perform task 302.

At task 303, the designer and the computer-aided-design system together generate a plan for fabricating sub-article 201, for fabricating sub-article 202, and for assembling sub-article 201 and sub-article 202 into article 200. The plan is described in FIG. 11 and in the accompanying text.

At task 304, the designer and the computer-aided-design system together select for each sub-article, a combination of:
 (i) a sewing substrate, and
 (ii) one or more stitches and stitching locations for each sewing substrate, and
 (iii) a thread processes and one or more threads for each stitch.

Sewing Substrates—

The primary functions of a sewing substrate are:
 (i) to provide a material that can hold one or more threads in a desired geometry and with a desired tension during overmolding, and
 (ii) (in some embodiments of the present invention) to make a significant contribution to the physical properties of the article of manufacture that is independent of the contribution made by the thread or threads.

In accordance with the illustrative embodiment, a sewing substrate can be:
 (i) a sewable solid or
 (ii) a textile, or
 (iii) any combination of i and ii.

For the purposes of this specification, the term "sewable solid" is defined as a material that is capable of being sewn or laced and is not a textile. In accordance with the illustrative embodiment, a sewable solid can be any plastic, such as, but not limited to, the plastics described below that are used for overmolding. In contrast, some sewable solids are metals or alloys (e.g., copper, gold, silver, nickel, aluminum, iron, stainless steel, etc.).

In accordance with the illustrative embodiment, the plastic used for the sewable solid can be the same plastic used to overmold the sewable solid, but will be clear to those skilled in the art, after reading this disclosure, how to make and use alternative embodiments of the present invention in which the sewable solid is made of a different material (plastic or non-plastic) than the plastic used to overmold the sewable solid.

Some sewable solids can be pierced with a sewing needle; some sewable solids are formed with perforations through which one or more threads can be sewn or laced, and some sewable solids must be drilled with holes through which threads can be sewn or laced. In any case, it will be clear to those skilled in the art, after reading this disclosure, how to make and use embodiments of the present invention that use a sewable solid as a sewing substrate.

Some sewable solids have a bending stiffness that is greater than the thread(s) with which they are sewn. In contrast, some sewable solids have a bending stiffness that is less than the thread(s) with which they are sewn. It will be clear to those skilled in the art, after reading this disclosure, how to make and use alternative embodiments of the present invention that use sewable solids and threads of any combination of relative bending stiffness to achieve the desired physical properties of the finished article of manufacture.

For the purposes of this specification, a "textile" is defined as a material that is manufactured from a network of:
 (i) natural fibers, or
 (ii) synthetic fibers, or
 (iii) semi-synthetic fibers, or
 (iv) any combination of i, ii, and iii.

Examples of natural fibers include, but are not limited to:
 vegetable fibers, which include, but are not limited to: cotton, hemp, jute, flax, ramie, sisal, bagasse, and banana;
 wood fiber, which include, but are not limited to: groundwood, lacebark, thermomechanical pulp (TMP), and bleached or unbleached kraft or sulfite pulps;
 animal fibers, which include, but are not limited to: silkworm silk, spider silk, sinew, catgut, wool, sea silk and hair such as cashmere wool, mohair and angora, fur such as sheepskin, rabbit, mink, fox, beaver, etc.;
 mineral fibers, which include, but are not limited to: chrysotile of the serpentine class and those belonging to the amphibole class: amosite, crocidolite, tremolite, anthophyllite, actinolite, wollastonite, and palygorskite; and
 biological fibers, which include, but are not limited to: the collagen family of proteins, tendon, muscle proteins like actin, cell proteins like microtubules and many others, spider silk, sinew and hair etc.

Examples of semi-synthetic fibers include, but are not limited to, the cellulose regenerated fibers rayon, bamboo fiber, Lyocell, Modal (using beech trees as input), diacetate fiber, and triacetate fiber.

Examples of synthetic fibers include, but are not limited to:
 metallic fibers, which include, but are not limited to: copper, gold, silver, nickel, aluminum, iron, and stainless steel;
 carbon fibers;
 carbon nanotubes;
 silicon carbide fibers;
 fiberglass fibers, which include, but are not limited to: man-made fibers that come from natural raw materials, silica fiber, made from sodium silicate (water glass) and basalt fiber made from melted basalt;
 mineral fibers, which include, but are not limited to: asbestos; and
 polymer fibers, which include, but are not limited to: polyamide nylon, PET or PBT polyester, phenol-formaldehyde (PF), polyvinyl chloride fiber (PVC) vinyon, polyolefins (PP and PE) olefin fiber, acrylic polyesters, aromatic polyamids (aramids) such as Twaron, Kevlar and Nomex, polyethylene (PE), eventually with extremely long chains/HMPE (e.g., Dyneema or Spectra, etc.), polyurethane fiber, and Elastolefin.

Examples of textiles include, but are not limited to, a network of fibers that are formed by:
 (i) weaving,
 (ii) knitting,
 (iii) crocheting,
 (iv) knotting, or
 (v) felting, or
 (vi) any combination of i, ii, iii, iv, and v.

Stitches—

One or more threads can be sewn into a sewable substrate in accordance with a stitch. In accordance with the illustrative embodiment, stitches are categorized by the number of threads in the stitch (e.g., one-thread processes, two-thread processes, three-thread processes, four-thread processes, five-thread processes, etc.). One-thread processes include, but are not limited to the back tack, the backstitch, the basting stitch, the blanket stitch, the blind stitch, the buttonhole stitch, the chain stitch, the cross-stitch, the catch stitch, the darning stitch, the embroidery stitch, the hemstitch, the overcast stitch, the pad stitch, the pick stitch, the running stitch, the sailmaker's stitch, the slip stitch, the stating stitch, the tensile stitch, the tent stitch, the topstitch, and the whipstitch. Two-thread processes include, but are not limited to the chain stitch, the lock stitch, the straight stitch, the zigzag stitch, the stretch stitch, the cover stitch, the running stitch, the back stitch, the satin stitch, and the outline stitch. One-thread, two-thread, three-thread, four-thread, and five-thread processes include, but are not limited to the overlock stitches. It will be clear to those skilled in the art, after reading this disclosure, how to make and use embodiments of the present invention that sew one or more threads into a sewable substrate in accordance with any stitch.

Threads—

For the purposes of this specification, a "thread" is defined as a long continuous length of one or more interlocked fibers. The fibers can be natural, synthetic or semi-synthetic.

Figure 6:
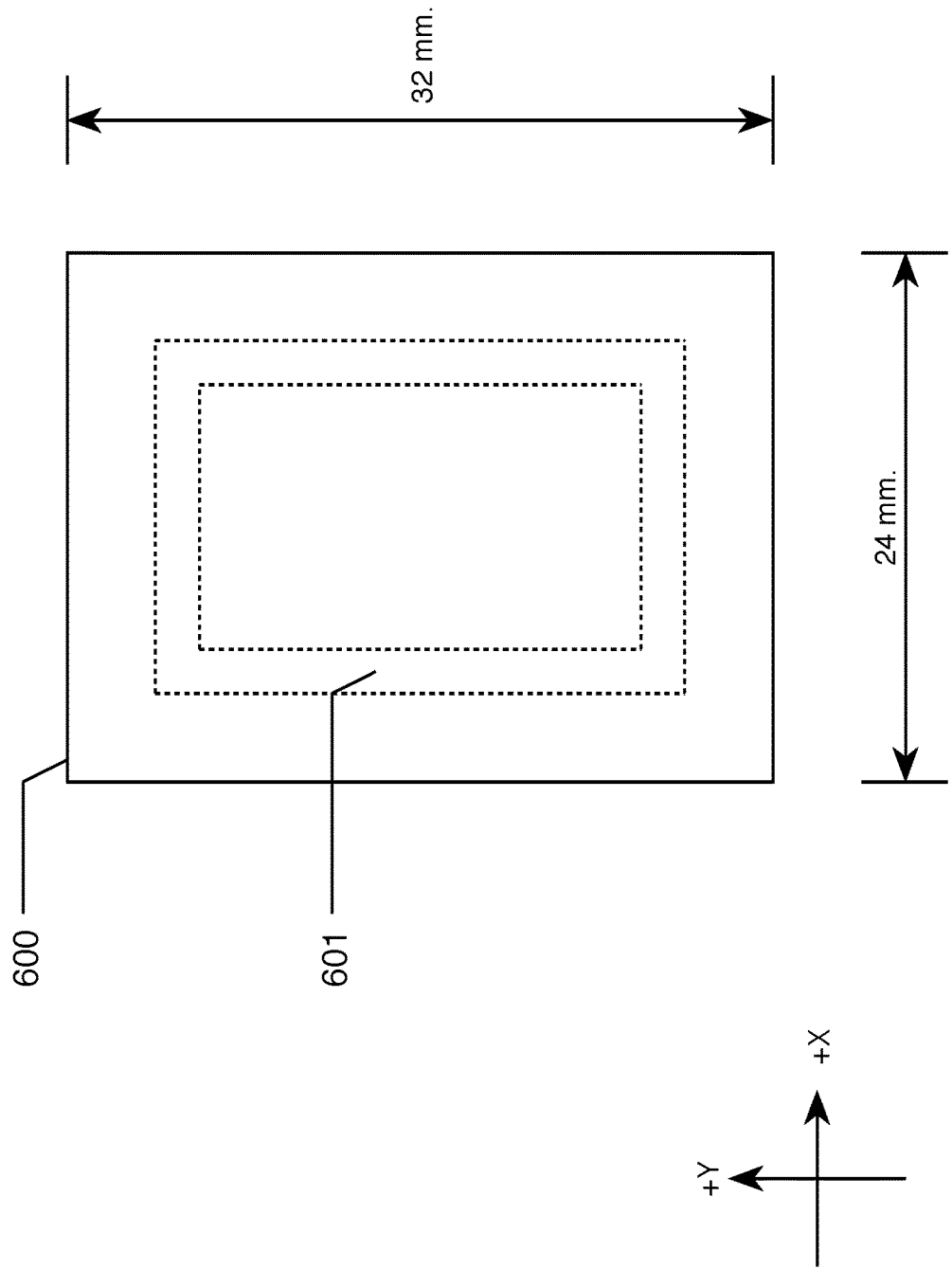
FIG. 6 depicts a drawing of sewing substrate 600, which is the sewing substrate for sub-article 201.

FIG. 6 depicts a drawing of sewing substrate 600, which is the sewing substrate for sub-article 201. In accordance with the illustrative embodiment, the designer and the computer-aided-design system together have selected a sewable solid for sewing substrate 600. In particular, the sewing substrate 600 is a 32 mm. by 24 mm. by 0.5 mm block-shaped piece of solid PEEK. For context and pedagogical purposes only, the part of sewing substrate 600 that will become part of sub-article 201 is shown in FIG. 6 with dotted lines as footprint 601.

FIG. 7 depicts a drawing of sewing substrate 700, which is the sewing substrate for sub-article 202. In accordance with the illustrative embodiment, the designer and the computer-aided-design system together have selected a textile as sewing substrate 700. In particular, sewing substrate 700 is a 24 mm. by 32 mm. piece of continuous 1K carbon-fiber tows in a 1×1 biaxial weave. For context and pedagogical purposes only, the part of sewing substrate 700 that will become part of sub-article 202 is shown in FIG. 7 with dotted lines as footprint 701.

Figure 8C:
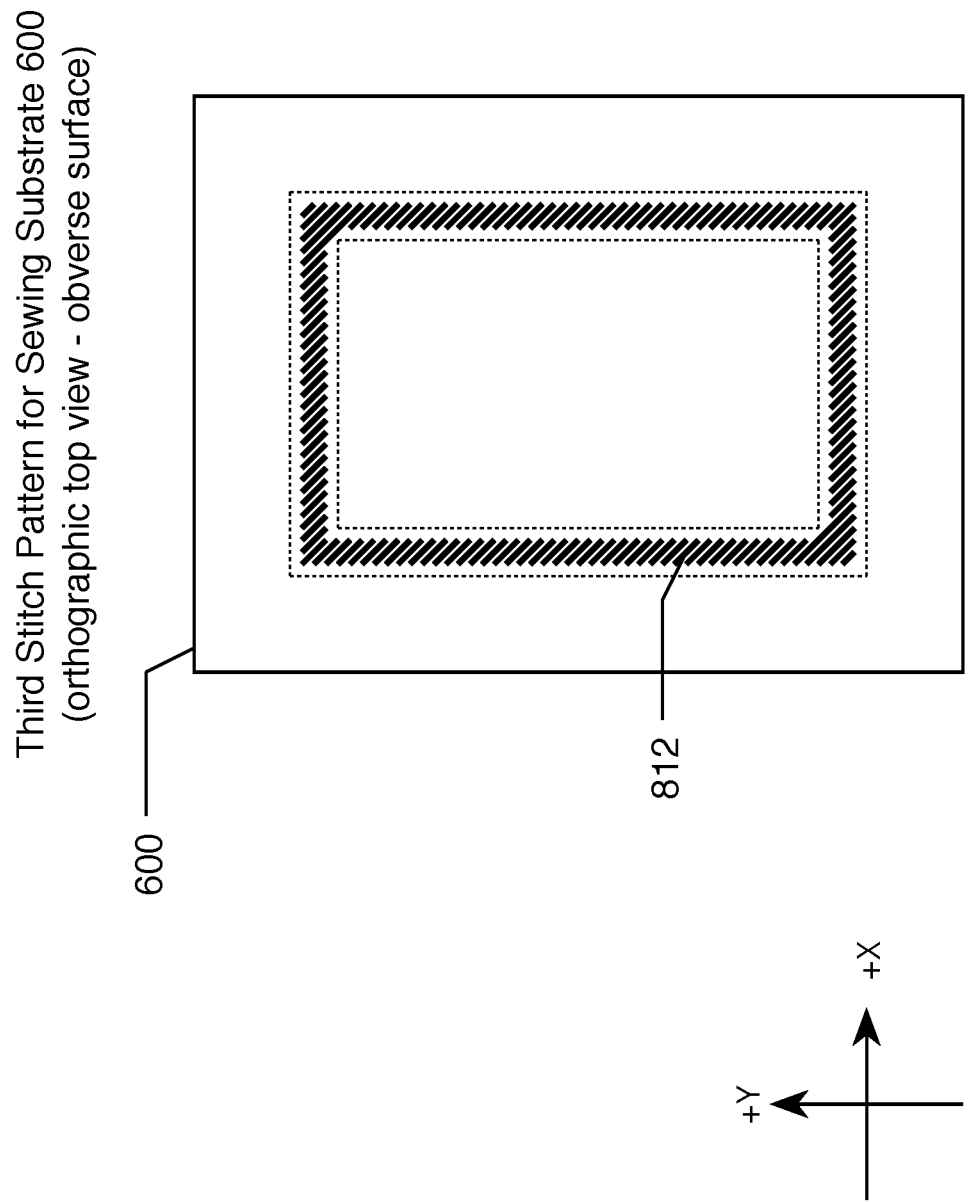
FIG. 8c depicts a drawing of sewing substrate 600 and third stitch pattern.

In accordance with the illustrative embodiment, sewing substrate 600 is sewn with three stitches:
  (i) a two-thread tensile stitch at one stitch per millimeter using a 4K continuous carbon tow (tow 801 in FIG. 8a) as the first (i.e., upper) thread on the obverse surface of sewing substrate 600 and a cotton tex 25 yarn (yarn 802 in FIG. 8a) as the second (i.e., lower) thread on the reverse surface of sewing substrate 600 (in the rectangle shown in FIG. 8a). Tow 801 is sewn at a tension that is high enough that there is no slack in tow 801.
  (ii) a two-thread satin stitch at 4 stitches per millimeter with a 1K continuous carbon-tow (tow 811 in FIG. 8b) as both the first thread (on the obverse surface) and the second thread (on the reverse surface) at a 45° angle to the X-axis, in the locations shown in FIG. 8b.
  (iii) a two-thread satin stitch at 4 stitches per millimeter with a 1K continuous carbon-tow (tow 812 in FIG. 8c) as both the first thread (on the obverse surface) and the second thread (on the reverse surface) at a −45° angle to the X-axis, in the locations shown in FIG. 8c.

In accordance with the illustrative embodiment of the present invention, the tensile stitch is sewn into sewing substrate 600 first and then the 45° angle satin stitch is sewn on top of the tensile stitch and then the −45° satin stitch is sewn on top of the 45° angle satin stitch.

Referring to FIG. 8a, the two-thread tensile stitch begins at location 805, then traverses footprint 601 as shown, and ends at location 805. The salient characteristic of the two-thread tensile stitch is that tow 801 resides solely on the obverse (i.e., +Z) surface of sewing substrate 600 whereas yarn 802 resides on the reverse (i.e., −Z) surface of sewing substrate 600, yarn 802 traverses the holes in sewing substrate 600, and the entwine points of tow 801 and yarn 802 reside—not within sewing substrate 600—but on the obverse surface of sewing substrate 600.

Figure 9A:
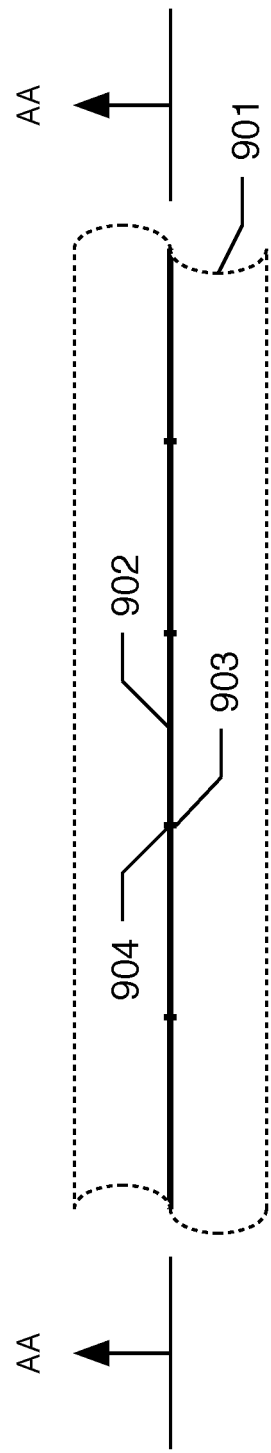
FIG. 9a depicts a drawing of the orthographic top view of the anatomy of a tensile stitch.
Figure 9B:
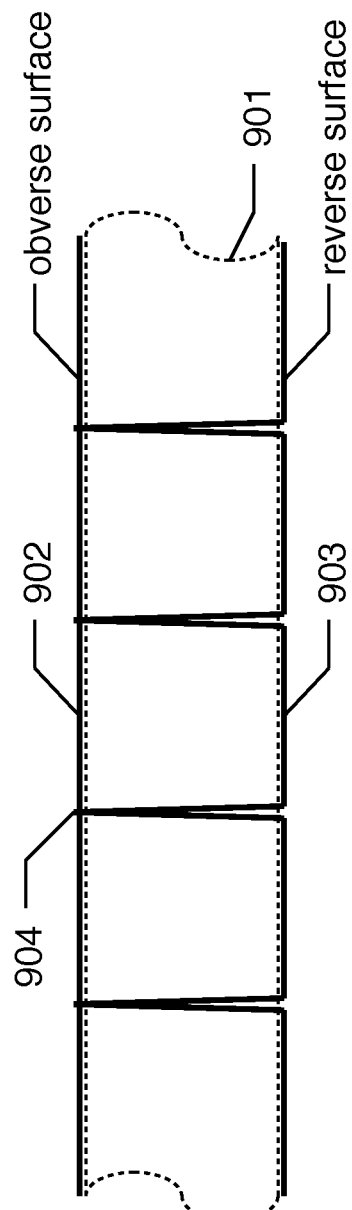
FIG. 9b depicts a drawing of the orthographic side view of the tensile stitch at cross-section AA-AA.

FIGS. 9a and 9b depict the anatomy of a two-thread tensile stitch in accordance with the illustrative embodiment of the present invention. FIGS. 9a and 9b depict sewing substrate 901 (shown in dotted lines), upper thread 902, lower thread 903, and entwine point 904. As can be seen in FIG. 9b, upper thread 902 resides on the obverse surface of sewing substrate 901, whereas lower thread 903 resides on the reverse surface, traverses a hole in sewing substrate 901 at each stitch location, and creates entwine point 904 on the obverse surface.

In a typical two-thread straight stitch process, such as those used in garment manufacturing, the tension on the upper thread and the tension on the lower thread are regulated to be equal. This causes the upper thread and the lower thread to entwine at points below the surface of the textile. In contrast, a tensile stitch in accordance with the illustrative embodiment is formed by making the upper thread tension greater than the lower thread tension. This disparity in thread tension causes the upper thread and the lower thread to entwine not in the middle of the sewing substrate but at points on the surface of the substrate. It will be clear to those skilled in the art, after reading this disclosure, how to make and use embodiments of the present invention that comprise a tensile stitch.

Figure 10B:
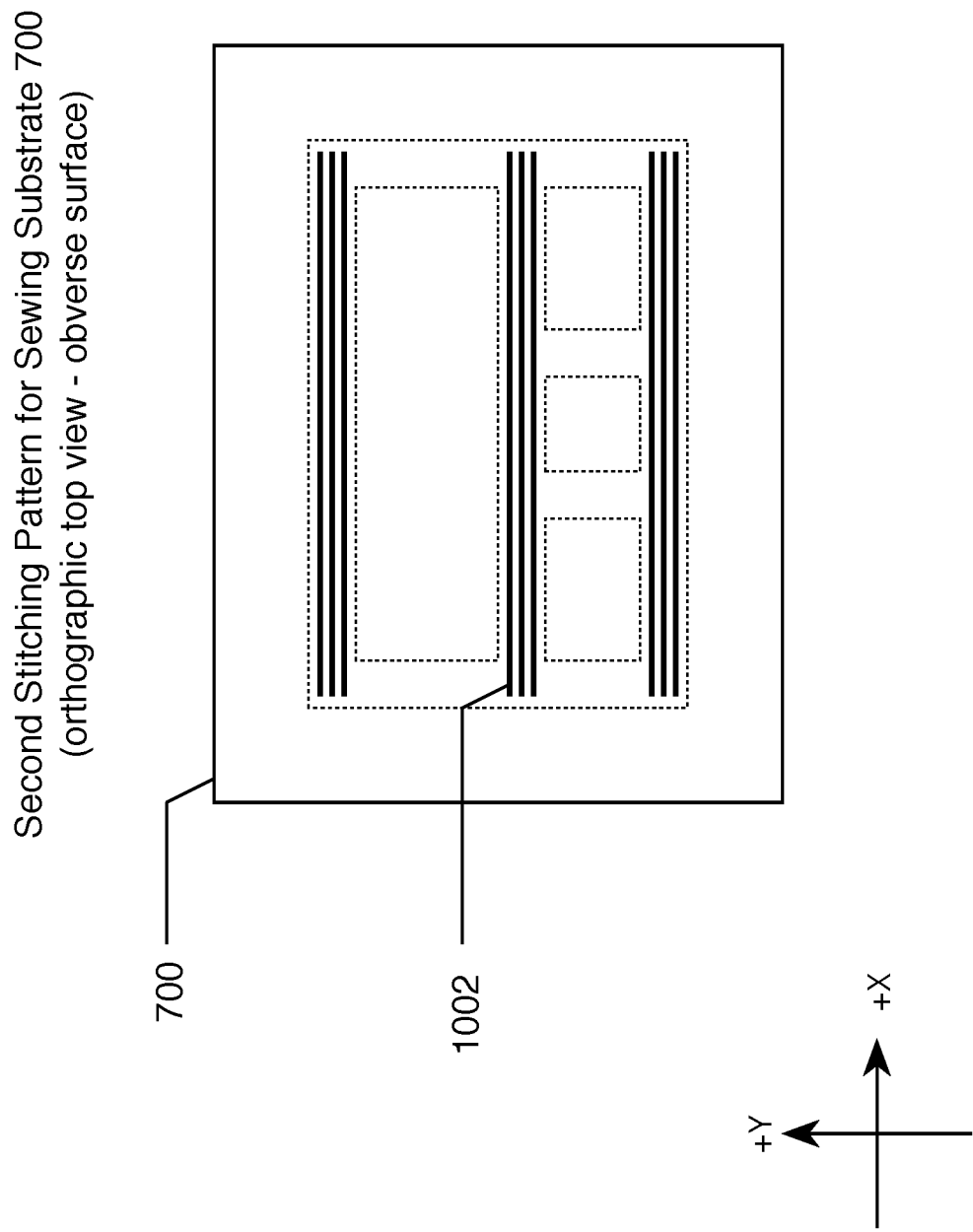
FIG. 10b depicts a drawing of sewing substrate 700 and second stitch pattern.

In accordance with the illustrative embodiment, sewing substrate 700 is sewn with two stitches:
  (i) a two-thread zig-zag stitch with a stitch width of 1 mm. and a stitch width of 1 mm. 1K continuous carbon tow (tow 1001 in FIG. 10a) as both the first (i.e., upper) thread (on the obverse surface) and as the second (i.e., lower) thread (on the reverse surface) in the locations shown in FIG. 10a.
  (ii) a two-thread tensile stitch at 0.25 stitches per millimeter with a tex 50 copper monofilament (filament 1002 in FIG. 1b) as the first (i.e., upper) thread (on the obverse surface) and a cotton tex 25 yarn (not shown in FIG. 10b) as the second (i.e., lower) thread (on the reverse surface) in the rectangle shown in FIG. 10b.

In accordance with the illustrative embodiment of the present invention, the zig-zag stitch is sewn into sewing substrate 700 first and then the tensile stitch is sewn on top of the zig-zag stitch.

At task 305, the manufacturer fabricates article 200 in accordance with the plan generated in task 102. It will be clear to those skilled in the art, after reading this specification, how to make and use embodiments of the present invention.

Figure 11:
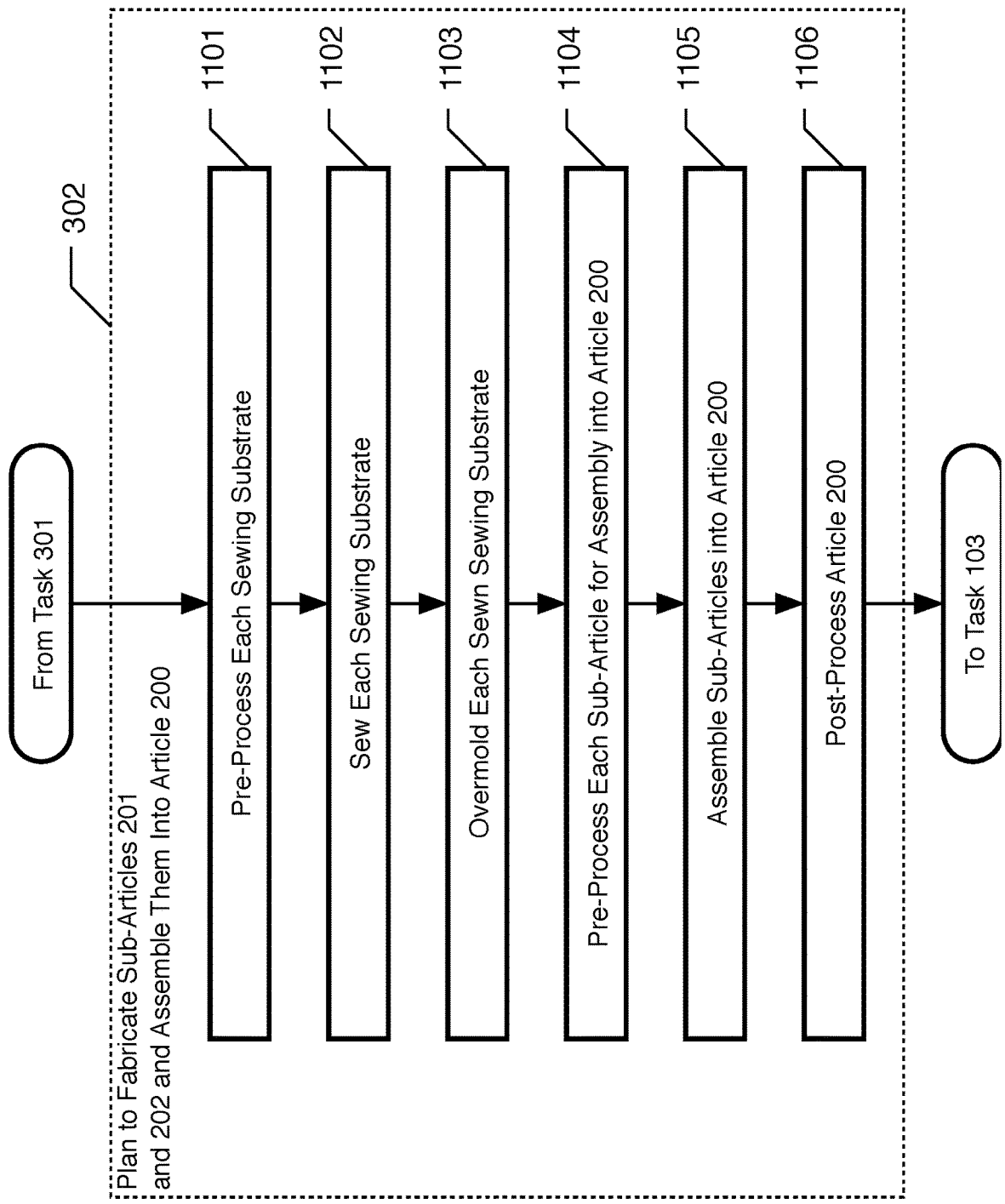
FIG. 11 depicts a flowchart of the salient tasks associated fabricating sub-article 201, sub-article 202, and assembling them into article 200.

FIG. 11 depicts a flowchart of the salient tasks associated with the plan for fabricating sub-article 201, for fabricating sub-article 202, and for assembling sub-article 201 and sub-article 202 into article 200.

At task 1101, sewing substrates 600 and 700 are preprocessed in preparation for sewing in task 305. In accordance with the illustrative embodiment, sewing substrates 600 and 700 are to be preprocessed by affixing each one to a frame (not shown in the figures)—akin to an embroidery hoop—that maintains the sewing substrate under tension during sewing and overmolding and prevents the sewing substrate from warping or wrinkling.

It will be clear to those skilled in the art, after reading this disclosure, how to make and use alternative embodiments of the present invention in which a sewing substrate is preprocessed in other ways prior to sewing. The preprocessing of a sewing substrate can include, for example and without limitation: heating, cooling, drying, desiccating, wetting, rolling, folding, lubricating, drilling, cutting, and molding (from 2D into 3D).

At task 1102, sewing substrate 600 (of a specific material and a specific geometry) is sewn with threads (of specific materials and specific stitches in specific locations). Sewing substrate 600 is described in detail in task 303 and in the accompanying figures and text.

Furthermore, sewing substrate 700 (of a specific material and a specific geometry) is sewn with threads (of specific materials and specific stitches in specific locations). Sewing substrate 700 is described in detail in task 303 and in the accompanying figures and text.

At task 1103, sewing substrate 600—after it has been sewn—is overmolded with a thermoplastic using an injection-molding process (to form sub-article 201).

In accordance with the illustrative embodiment, the thermoplastic is, in general, a semi-crystalline polymer and, in particular, the polyaryletherketone (PAEK) known as polyetherketone (PEK). It will be clear to those skilled in the art, after reading this disclosure, how to make and use alternative embodiments of the present invention in which the thermoplastic is another semi-crystalline material such as, but not limited to, polyaryletherketone (PAEK), polyetheretherketone (PEEK), polyetherketoneketone (PEKK), polyetheretherketoneketone (PEEKK), and polyetherketoneetherketoneketone (PEKEKK).

In accordance with some alternative embodiments of the present invention, the semi-crystalline polymer is not a polyaryletherketone (PAEK) but another semi-crystalline thermoplastic (e.g., polyamide (PA), polybutylene terephthalate (PBT), poly(p-phenylene sulfide) (PPS), etc.) or a mixture of a semi-crystalline polymer and an amorphous polymer.

When the thermoplastic comprises a blend of an amorphous polymer with a semi-crystalline polymer, the semi-crystalline polymer can one of the aforementioned materials and the amorphous polymer can be a polyarylsulfone, such as polysulfone (PSU), polyethersulfone (PESU), polyphenylsulfone (PPSU), polyethersulfone (PES), or polyetherimide (PEI). In some additional embodiments, the amorphous polymer can be, for example and without limitation, polyphenylene oxides (PPOs), acrylonitrile butadiene styrene (ABS), methyl methacrylate acrylonitrile butadiene styrene copolymer (ABSi), polystyrene (PS), or polycarbonate (PC), acrylonitrile butadiene styrene (ABS), polyether sulfones (PES), poly (arylene sulfone)s or simply polysulfone (PSU), polyphenylsulfone (PPSU), and polyetherimide (PEI).

When the thermoplastic comprises a blend of an amorphous polymer with a semi-crystalline polymer, the weight ratio of semi-crystalline material to amorphous material can be in the range of about 50:50 to about 95:05, inclusive, or about 50:50 to about 90:10, inclusive. Preferably, the weight ratio of semi-crystalline material to amorphous material in the blend is between 60:40 and 80:20, inclusive. The ratio selected for any particular application may vary primarily as a function of the materials used and the properties desired for the article of manufacture.

Although the sewing substrate is overmolded with a thermoplastic, it will be clear to those skilled in the art, after reading this disclosure, how to make and use alternative embodiments of the present invention in which a sewing substrate is overmolded with a thermoset after it is sewn.

Although the sewing substrate is overmolded with an injection-molding process, it will be clear to those skilled in the art, after reading this disclosure, how to make and use alternative embodiments of the present invention in which a sewing substrate is overmolded with a compression-molding process.

As part of task 1102, sewing substrate 700—after it has been sewn—is overmolded with a thermoplastic using an injection-molding process (to form sub-article 202).

In accordance with the illustrative embodiment, sewing substrate 600 is overmolded PEEK so that the PEEK comprising sewing substrate 600 becomes homogeneous with the PEEK added during overmolding.

In accordance with the illustrative embodiment, sewing substrate 700 is overmolded with the injection-molding process as that used to overmold sewing substrate 600, but it will be clear to those skilled in the art, after reading this disclosure, how to make and use alternative embodiments of the present invention in which different sub-articles are overmolded with different processes (e.g., compression molding, etc.).

At task 1104, sub-article 201 and sub-article 202 are each pre-processed in preparation for assembly into article 200. In accordance with the illustrative embodiment, task 1104 includes cutting away the residual portions of sewing substrate 600 that are not part of sub-article 201 and the residual portions of sewing substrate 700 that are not part of sub-article 202. It will be clear to those skilled in the art, after reading this disclosure, how to post-process after overmolding and pre-process for compression molding any sub-articles of manufacture.

At task 1105, sub-article 201 and sub-article 202 are assembled with an adhesive to form article 200. It will be clear to those skilled in the art, after reading this disclosure, how to assemble any number of sub-articles into a final article of manufacture.

At task 1106, article of manufacture 200 is post-processed, which includes deburring, sanding, polishing, priming, and painting. It will be clear to those skilled in the art, after reading this disclosure, how to post-process any article of manufacture.

It is understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:
1. An article of manufacture comprising:
a sewable solid that is made of a thermoplastic, wherein the sewable solid comprises an obverse surface and a reverse surface;
a first thread that lies on the obverse surface of the sewable solid;

a second thread that lies on the reverse surface of the sewable solid and that penetrates the sewable solid such that the first thread and the second thread form a first two-thread lockstitch with a first plurality of entwine points on the obverse surface of the sewable solid; and an overmolding of the thermoplastic that encases the first thread, the second thread, and the sewable solid.

2. The article of manufacture of claim 1 further comprising:

a third thread that overlaps the first thread on the obverse surface of the sewable solid; and a fourth thread that overlaps the second thread on the reverse surface of the sewable solid and that also penetrates the sewable solid such that the third thread and the fourth thread form a second two-thread lockstitch;

wherein the overmolding of the thermoplastic also encases the third thread and the fourth thread.

3. The article of manufacture of claim 2 wherein the second two-thread lockstitch forms a second plurality of entwine points on the obverse surface of the sewable solid.

4. The article of manufacture of claim 2 wherein the second two-thread lockstitch forms a second plurality of entwine points on the reverse surface of the sewable solid.

5. The article of manufacture of claim 1 wherein each of the sewable solid and the first thread has a bending stiffness, and wherein the bending stiffness of the sewable solid is greater than the bending stiffness of the first thread.

6. The article of manufacture of claim 1 wherein each of the sewable solid and the first thread has a bending stiffness, and wherein the bending stiffness of the first thread is greater than the bending stiffness of the sewable solid.

7. The article of manufacture of claim 1 wherein the sewable solid has a thickness, wherein the first thread has a diameter, and wherein the thickness of the sewable solid is greater than the diameter of the first thread.

8. An article of manufacture comprising:

a sewable solid that is made of a thermoplastic, wherein the sewable solid comprises an obverse surface and a reverse surface;

a first thread that lies on the obverse surface of the sewable solid;

a second thread that lies on the reverse surface of the sewable solid and that penetrates the sewable solid such that the first thread and the second thread form a first two-thread lockstitch with the first thread being rectilinear through a first plurality of entwine points; and an overmolding of the thermoplastic that encases the first thread, the second thread, and the sewable solid;

wherein each of the sewable solid and the first thread has a bending stiffness, and wherein the bending stiffness of the sewable solid is greater than bending stiffness of the first thread.

9. The article of manufacture of claim 8 wherein the first two-thread lockstitch comprises the first plurality of entwine points on the obverse surface of the sewable solid.

10. The article of manufacture of claim 8 further comprising:

a third thread that overlaps the first thread on the obverse surface of the sewable solid; and a fourth thread that overlaps the second thread on the reverse surface of the sewable solid and that also penetrates the sewable solid such that the third thread and the fourth thread form a second two-thread lockstitch;

wherein the overmolding of the thermoplastic also encases the third thread and the fourth thread.

11. The article of manufacture of claim 10 wherein the second two-thread lockstitch forms a second plurality of entwine points on the obverse surface of the sewable solid.

12. The article of manufacture of claim 10 wherein the second two-thread lockstitch forms a second plurality of entwine points on the reverse surface of the sewable solid.

13. The article of manufacture of claim 8 wherein the sewable solid has a thickness, wherein the first thread has a diameter, and wherein the thickness of the sewable solid is greater than the diameter of the first thread.

\* \* \* \* \*